United States Patent
Huang et al.

(10) Patent No.: US 8,958,646 B2
(45) Date of Patent: Feb. 17, 2015

(54) IMAGE PROCESSING DEVICE, IMAGE PROCESSING METHOD, IMAGE PROCESSING PROGRAM, AND INTEGRATED CIRCUIT

(75) Inventors: Zhongyang Huang, Singapore (SG); Yang Hua, Singapore (SG); Shuicheng Yan, Singapore (SG); Qiang Chen, Singapore (SG); Ryouichi Kawanishi, Kyoto (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 114 days.

(21) Appl. No.: 13/700,241

(22) PCT Filed: Apr. 4, 2012

(86) PCT No.: PCT/JP2012/002339
§ 371 (c)(1),
(2), (4) Date: Nov. 27, 2012

(87) PCT Pub. No.: WO2012/137493
PCT Pub. Date: Oct. 11, 2012

(65) Prior Publication Data
US 2013/0071031 A1    Mar. 21, 2013

Related U.S. Application Data

(60) Provisional application No. 61/472,810, filed on Apr. 7, 2011.

(51) Int. Cl.
*G06K 9/46* (2006.01)
*G06K 9/66* (2006.01)
(Continued)

(52) U.S. Cl.
CPC ............... *G06K 9/46* (2013.01); *G11B 27/034* (2013.01); *H04N 5/76* (2013.01)
USPC ........... 382/190; 382/305; 386/278; 715/723; 725/44

(58) Field of Classification Search
USPC .......................... 382/190, 285, 305; 386/278; 715/723–726; 725/44
See application file for complete search history.

(56) References Cited

U.S. PATENT DOCUMENTS 8,000,527 B2 *   8/2011   Grady et al. .................. 382/173
8,135,222 B2 *   3/2012   Bressan ........................ 382/225
(Continued)

FOREIGN PATENT DOCUMENTS

EP         2 296 378 A1      3/2011
EP         2296378 A1 *      3/2011
(Continued)

OTHER PUBLICATIONS

Lee et al. (Partition Min-Hash for Partial Duplicate Image Discover, ECCV 201, Part 1, LNCS 6311, 648-662).*
(Continued)

*Primary Examiner* — Aaron W Carter
(74) *Attorney, Agent, or Firm* — Wenderoth, Lind & Ponack, L.L.P.

(57) ABSTRACT

An image processing device combines a plurality of contents (e.g. videos) with a story line retained as much as possible, while reducing view's discomfort. The image processing device compares one of the contents, which contains a first partial content and a second partial content subsequent to the first partial content, with another one of the contents, which contains a plurality of consecutive partial contents; detects, as a third partial content, a partial content with the highest similarity value from among the plurality of partial contents; and generates relational information by using the highest similarity value obtained by the first processing unit. The relational information is then used for merging the first partial content, the second partial content and the third partial content.

18 Claims, 15 Drawing Sheets

(51) Int. Cl.
  *G11B 27/034* (2006.01)
  *H04N 5/76* (2006.01)

(56) References Cited

U.S. PATENT DOCUMENTS

| | | | | |
|---|---|---|---|---|
| 8,229,219 | B1* | 7/2012 | Ioffe | 382/168 |
| 8,356,035 | B1* | 1/2013 | Baluja et al. | 707/741 |
| 8,620,077 | B1* | 12/2013 | Grundmann et al. | 382/173 |
| 2003/0011676 | A1* | 1/2003 | Hunter et al. | 348/119 |
| 2003/0043152 | A1* | 3/2003 | Raskar | 345/473 |
| 2009/0003702 | A1* | 1/2009 | Ofek et al. | 382/181 |
| 2009/0067719 | A1* | 3/2009 | Sridhar et al. | 382/176 |
| 2009/0169065 | A1* | 7/2009 | Wang et al. | 382/118 |
| 2011/0025865 | A1* | 2/2011 | Kunishige et al. | 348/220.1 |
| 2011/0150419 | A1* | 6/2011 | Iwamoto et al. | 386/241 |
| 2011/0182517 | A1* | 7/2011 | Farsiu et al. | 382/190 |
| 2012/0084655 | A1* | 4/2012 | Gallagher et al. | 715/725 |
| 2012/0114167 | A1* | 5/2012 | Tian et al. | 382/100 |
| 2012/0114307 | A1* | 5/2012 | Yang et al. | 386/278 |
| 2012/0233159 | A1* | 9/2012 | Datta et al. | 707/728 |
| 2014/0146370 | A1* | 5/2014 | Banner et al. | 358/406 |

FOREIGN PATENT DOCUMENTS

| | | |
|---|---|---|
| JP | 2008-129942 | 6/2008 |
| JP | 2008129942 A * | 6/2008 |
| JP | 2011-35486 | 2/2011 |
| WO | 2009/157403 | 12/2009 |

OTHER PUBLICATIONS

Chen et al., "VideoPuzzle: Descriptive One-Shot Video Composition", IEEE, Apr. 3, 2013.*

International Search Report issued Jul. 17, 2012 in corresponding International Application No. PCT/JP2012/002339.

Gulrukh Ahanger et al., "Automatic Composition Techniques for Video Production", IEEE Transactions on Knowledge and Data Engineering, vol. 10, No. 6, Nov. 1998, pp. 967-987.

Xian-Sheng Hua et al., "Optimization-Based Automated Home Video Editing System", IEEE Transactions on Circuits and Systems for Video Technology, 2004.

Jeroen Vendrig et al., "Systematic Evaluation of Logical Story Unit Segmentation", IEEE Transactions on Multimedia, vol. 4, No. 4, Dec. 2002, pp. 492-499.

Hairong Liu et al., "Common Visual Pattern Discovery via Spatially Coherent Correspondences", Department of Electrical and Computer Engineering, National University of Singapore, 2010, pp. 1-8, 978-1-4244-6983-3/10/$26.00, IEEE.

* cited by examiner

IMAGE PROCESSING DEVICE, IMAGE PROCESSING METHOD, IMAGE PROCESSING PROGRAM, AND INTEGRATED CIRCUIT

This application claims benefit of U.S. Provisional Application No. 61/472,810, filed Apr. 7, 2011.

BACKGROUND OF INVENTION

1. Technical Field

The present invention relates to multimedia processing and image processing, and in particular to a technique of extracting contents having a similarity from among a plurality of contents and merging them.

2. Background Art

With the popularity of personal digital devices (e.g. digital cameras, digital video cameras), the number of personally recorded digital videos is increasing explosively. This is because of the following reasons, for example: (1) storage devices available for storing recorded videos (i.e. video clips) have increased in capacity; (2) recorded videos only contain a single shot, and their recording durations (i.e. playback durations) are very short; and (3) such videos are related to various subjects or events. Users often need to maintain their own video collections captured at different locations and time. However, when there are a very large number of videos, it is difficult for the users to manage and manipulate their videos. For example, it is not easy for a user to browse desired videos from among a large number of videos captured by the user.

Video summarization is a conventional technique for realizing efficient browsing of such a large amount of videos. According to the video summarization, however, there is a risk of missing details when features to be used for summarization are irrelevant to the story of the video. Moreover, it could be impossible to summarize the video when features to be used for summarization are contained in almost all of the frames of the video. In such cases, summarization could be inaccurate.

Besides the technique discussed above, there have been other techniques of compositing (i.e. merging) videos (See Non-Patent Literature 1 through 3). For example, Non-Patent Literature 1 discloses a technique of composing a coherent video automatically if there are appropriate domain-specific metadata associated with video segments. The system disclosed in Non-Patent Literature 2 automatically selects home video segments and aligns them with music to create an edited video segment.

Here, the term "shot" used in the present Description means the most basic physical entity in a video, and refers to an uninterrupted video clip recorded by a single camera. The term "single shot" (or "short shot") refers to an uninterrupted video clip with relatively short duration.

CITATION LIST

Non-Patent Literature

[Non-Patent Literature 1] Automatic composition techniques for video production. Knowledge and Data Engineering, 1998, G. Ahanger

[Non-Patent Literature 2] Optimization-Based Automated Home Video Editing System. IEEE Transactions on Circuits and Systems for Video Technology, 2004, X. S. Hua, L. Lu, and H. J. Zhang

[Non-Patent Literature 3] Systematic evaluation of logical story unit segmentation. IEEE Transactions on Multimedia, 2002, J. Vendrig and M. Worring

SUMMARY OF INVENTION

However, if one video is combined with another video according to the techniques proposed by the Non-Patent Literatures listed above, it is likely that an abrupt scene change occurs in playback of such a composite video at the switching between the one video to the other. In such cases, viewers may feel unpleasant about the transition from one video to another.

In view of the above-described problem, the present invention aims to provide an image processing device, an image processing method, an image processing program and an integrated circuit which are capable of combining a plurality of contents (e.g. videos) with a story line retained as much as possible, while reducing view's discomfort.

To fulfill the aim, one aspect of the present invention provides an image processing device comprising: a first processing unit configured to perform similarity detection on a group of video contents by comparing each one of the contents, which contains a first partial content and a second partial content subsequent to the first partial content, with another one of the contents as a subject content, which contains a plurality of consecutive partial contents constituting a portion of the subject content, so as to obtain a similarity value for each of the plurality of partial contents contained in the subject content in relation to the second partial content contained in the one of the contents, and to detect, as a third partial content, a partial content with the highest similarity value from among the plurality of partial contents contained in the subject content; and a second processing unit configured to generate relational information by using the highest similarity value obtained by the first processing unit, the relational information being used for merging the first partial content, the second partial content and the third partial content.

With the stated structure, the image processing device is capable of merging the second partial content with the third partial content, which has the highest similarity value among the plurality of partial contents. Because the contents are merged at their similar parts, the viewer does not feel unpleasant when the merged content is played back. Also, since the first partial content is contained in the merged content, the story line of the content involving the first partial content is retained.

DETAILED DESCRIPTION OF INVENTION

1. Embodiment

The following explains an embodiment according to the present invention with reference to the drawings.

1.1 Overview

An image processing device pertaining to the present invention automatically generates a virtual one-shot presentation (a single content) from a plurality of similar video clips (contents composed of moving pictures). In the following, "one-shot presentation" is also referred to as "one-shot video" or "merged video". The playback order (playback path) of contents constituting a virtual one-shot presentation is referred to as "Video Puzzle". The image processing device pertaining to the present invention extracts a group of videos with a consistent major topic from a plurality of videos. The topic can refer to a person, an object, or a scene. The topic can be specified by users or found with an automatic discovery method. The start-end frame correspondences of the videos are then established with at coarse-to-fine method, which will be described later, and a one-shot presentation with a long duration is generated by combining (merging) them in a seamless manner. Therefore, the present invention provides a novel presentation of video contents that enables users to have a deeper impression of the story within the videos.

1.2 Structure

Figure 1:
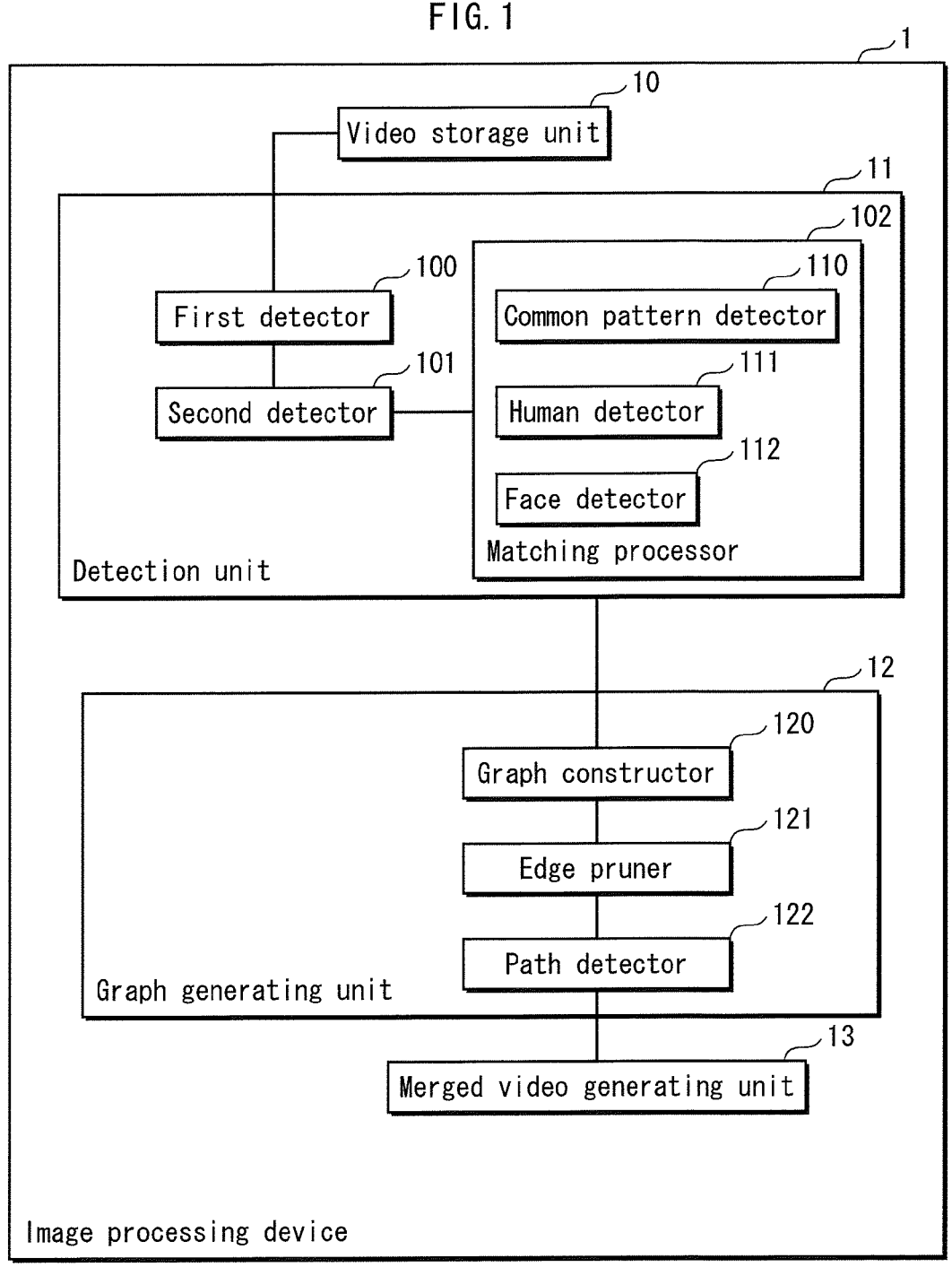
FIG. 1 is a block diagram showing the structure of an image processing device 1.

The following explains the structure of the image processing device 1 according to the present invention with reference to FIG. 1.

As shown in FIG. 1, the image processing device 1 includes a video storage unit 10, a detection unit 11, a graph generation unit 12 and a merged video generation unit 13.

The image processing device 1 has a structure including a processor and a memory, and the functions of each of the detection unit 11, the graph generation unit 12 and the merged video generation unit 13 are realized by the processor executing programs stored in the memory.

The detection unit 11 performs similarity detection on a group of videos (contents) by comparing each one of the videos, which contains consecutive two parts (a first partial content and a second partial content), with another one of the videos, which contains a plurality of consecutive partial contents constituting a portion of the other one of the videos, and detects a part (a third partial content) having a highest degree of similarity with the second partial content contained in the one of the videos from among the plurality of consecutive parts (partial contents) contained in the other one of the contents.

The graph generation unit 12 generates a graph showing the relationship between each of the plurality of videos and the video to be merged with it. The merged video generation unit 13 merges the partial contents in the following order: the first partial content, the second partial content, the third partial content, and a part (a fourth content) that is contained in the other one of the videos mentioned above and is subsequent to the third partial content.

The following describes each of the components in detail.

(1) Video Storage Unit 10

The video storage unit 10 is a memory region for storing a plurality of videos (contents pertaining to moving pictures). Each video stored in the video storage unit 10 is also referred to as a video clip.

(2) Detection Unit 11

The input to the detection unit 11 is the plurality of videos stored in the video storage unit 10. The detection unit 11 generates and outputs a collection of videos with a consistent major topic from the videos stored in the video storage unit 10 in order to generate a matching graph for each of the videos stored in the video storage unit 10.

As shown in FIG. 1, the detection unit 11 includes a first detector 100, a second detector 101, and a matching processor 102.

(2-1) First Detector 100

The first detector 100 calculates frame partial similarity between every pair of videos stored in the video storage unit 10 by using similarity calculated based on a predetermined feature conversion method. As the predetermined feature conversion method, the first detector 100 uses Partition Min-Hashing (PmH) algorithm, for example. The first detector 100 then selects, as candidate pairs, video pairs having a high degree of similarity in terms of their overviews, and generates a graph of video similarity based on the results of the selection. Specifically, the first detector 100 filters out video pairs with a lower similarity than a predetermined threshold, and selects up to 4 video pairs as the matching candidates for each video. Thus, the first detector 100 can detect matching frames in terms of overviews of the videos, instead of detecting exactly matching frames by using indices such as image features. Therefore, the computational cost for the further video matching steps is largely reduced.

Min-hash is a standard hashing scheme for discovering near-duplicate text documents or web pages. Recently min-hash and its variants have been applied to discovering near duplicate images, image clustering, image retrieval and object discovery. Here, "object" is a concept including a person or a thing. In the min-hash algorithm, a hash function is applied to all visual words in an image ignoring the location of visual words. The visual word with the minimum hash value is selected as a global descriptor of the given image. However, unlike text documents which are usually represented with bags of words, images are strongly characterized by their 2D structured objects which are often spatially localized in the image. PmH is a hashing scheme to exploit the locality. The basic procedure performed by the first detector 100 using PmH is as follows. Since visual words are well-known technology, their explanations are omitted here.

a) Acquire frames constituting a video;

b) Partition each frame into p rectangular regions of equal size;

c) Extract min-hash sketches by applying a same hash function to each partition, and store the min-hash sketches into a hash table; Here, the hash table shows divisions of a range that can be taken by the hash function. A min-hash sketch is stored into the division to which the value indicated by the min-hash sketch belongs.

d) Calculate similarity between videos for each video pair based on the hash table according to the number of min-hash sketches that collide with other sketches. Specifically, the similarity is calculated by Formula 1 shown below.

e) Select top four video pairs with largest calculated values (highest similarities) from among the pairs of videos.

[Math. 1]

$$W_{i,j} = \sum_{m=1}^{\ell} \sum_{n=1}^{\ell'} \frac{\delta(V_{i,m}, V_{j,n})}{|V_i| \cdot |V_j|} \quad \text{(Formula 1)}$$

Here, $V_{i,m}$ denotes $m^{th}$ frame of video $V_i$, and $V_{j,n}$ denotes $n^{th}$ frame of video $V_j$. $\delta(V_{i,m}, V_{j,n})$ is defined to be "1" when one min-hash sketch of partitions in $m^{th}$ frame of video $V_j$ collides with other min-hash sketches of partitions in $n^{th}$ frame of video $V_j$, and is defined to be "0" when no collision occurs. $|V_i|$ and $|V_j|$ respectively denote the frame numbers of video $V_i$ and video $V_j$.

(2-2) Second Detector 101

The input to the second detector 101 is the candidate pairs selected by the first detector 100. The second detector 101 detects similarity between sub-sequences (hereinafter also referred to as frame sequences) included in each of the candidate video pairs.

The following explains the functions of the second detector 101 in detail.

The second detector 101 extracts, from each video of the candidate pair (e.g. video $V_i$ and video $V_j$) selected by the first detector 100, the ending part of the video $V_i$ and the starting part of the video $V_j$, and detects sequence correspondence $S_{i,j}$ between them. Here, for example, the ending part is the second half of the video divided in two in terms of the playback duration of the video, and the starting part is the first half of the video divided in two in terms of the playback duration of the video.

To calculate the sequence correspondence $S_{i,j}$, the second detector 101 first divides each of the ending part of the video $V_i$ and the starting part of the video $V_j$ into sub-sequences (frame sequences) having a same length (same playback duration). In this example, the ending part of the video $V_i$ is divided into $Seq_{i,1}, Seq_{i,2}, \ldots$ and $Seq_{i,p}$, and the starting part of the video $V_j$ is divided into $Seq_{j,1}, Seq_{j,2}, \ldots$ and $Seq_{i,q}$. The lengths (playback durations) of $Seq_{i,1}, Seq_{i,2}, \ldots$ and $Seq_{i,p}$, and $Seq_{j,1}, Seq_{j,2}, \ldots$ and $Seq_{i,q}$ are the same. $Se_{qi,1}, Seq_{i,2}, \ldots$ and $Seq_{i,p}$ are located in the ending part of the video $V_i$, and $Seq_{i,p}$, and $Seq_{j,1}, Seq_{j,2}, \ldots$ and $Seq_{j,q}$ are located in the starting part of the video $V_j$.

The second detector 101 detects similarity between the ending part $Seq_{i,s}$ (s is an integer satisfying 1≤s≤p) and each of the starting parts $Seq_{j,1}, Seq_{j,2}, \ldots$ and $Seq_{j,q}$, based on a predetermined constant rate. For example, based on the predetermined constant rate, the second detector 101 detects frame similarity between the frame sequence $Seq_{i,s}$ and the frame sequence $Seq_{j,t}$ (t is an integer satisfying 1≤t≤q).

Here, the constant rate indicates a sampling rate used for detecting (sampling) the similarity based on the frame rate of the video. For example, when the frame rate of the video is 30 frames/sec and the constant rate is 30, the second detector 101 detects similarity of one frame per second. When the frame rate is the same as above and the constant rate is 15, the second detector 101 detects similarity of two frames per second. Similarly, when the constant rate is 6, the second detector 101 detects similarity of five frames per second. When the playback duration is five second, the frame rate is 30 frames/sec, and the constant rage is 30, each of the frame sequence $Seq_{i,s}$ and the frame sequence $Seq_{j,t}$ includes 150 frames (i.e. 30 frames/sec×5 seconds). The second detector 101 detects similarity between each of the frames in the frame sequence $Seq_{i,s}$ as detection target frames, including the top frame and the following frames occurring every 1 second after the top frame, and the frames included in the frame sequence $Seq_{j,t}$. When the constant rate is 1, similarity is detected for every frame included in the frame sequence $Seq_{i,s}$.

The second detector 101 calculates sequence similarity $VS_{i,j}$ between each of the detection target frames determined by the constant rate and the frames included in the frame sequence $Seq_{j,t}$ by Formula 2 as follows.

[Math. 2]

$$VS_{i,j} = \sum_{x \in seq_{i,s}} \max_{y \in seq_{j,t}} \frac{score_{x,y}}{|k|} \quad \text{(Formula 2)}$$

Here, $score_{x,y}$ denotes a frame similarity value, which will be described later. x denotes the frame number of a frame belonging to $Seq_{i,s}$, and y denotes the frame number of a frame belonging to $Seq_{j,t}$. $|k|$ denotes the number of detection target frames in $Seq_{i,s}$. Thus, the frame similarity obtained by Formula 2 is the average of the maxim values of $score_{x,y}$ calculated for each of the detection target frames included in $Seq_{i,s}$.

To calculate similarity between frames, the second detector 101 performs image local keypoints matching. For the matching, SIFT+Color Moments with Difference of Gaussians (DOG) keypoint detector is used. The SIFT descriptors and Color Moments are complementary to each other. The SIFT descriptors describe the local structure, and the Color Moments describe the structure of local differences to provide higher order information. Using these schemes, the second detector 101 acquires local keypoints as feature points of an image.

To determine the local match of given two frames from different video clips, the best candidate match for each keypoint of the source image (such as a frame of $V_i$) is found by identifying its nearest local keypoint among the keypoints from the target image (such as a frame of $V_j$).

The nearest local keypoint is defined as the local keypoint with the minimum Euclidean distance. Since there will be many keypoints from the source image that do not have any correct match in the target image, such as those that arise from background clutter or are not detected in the target image, it is useful to discard them. The second detector 101 obtains an effective measure by comparing the distance of the closest neighbor to that of the second-closest. Then, the second detector 101 obtains a keypoint matching set KS indicating the number of matching local keypoints, and a matching score T indicating the degree of match among the matching local keypoints.

Using the keypoint matching set KS and the matching score T obtained by the local matching, the second detector 101 calculates an inter-frame similarity value by Formula 3 shown below.

[Math. 3]

$$score_{x,y} = \sum_{j \in ks} \frac{T_j}{|KS|} \quad \text{(Formula 3)}$$

|KS| denotes the size of the keypoint matching set, i.e. the number of elements contained in the keypoint matching set. j denotes an integer satisfying $1 \leq j \leq |KS|$. Each element (i.e. matching keypoint) belonging to the keypoint matching set is assigned a different integer among integers falling within the range of 1 to |KS|, inclusive. $T_j$ denotes the matching score of the matching keypoint assigned an integer j.

The second detector 101 then calculates the frame similarity by using Formula 2 and the similarity value obtained by Formula 3.

Figure 2:
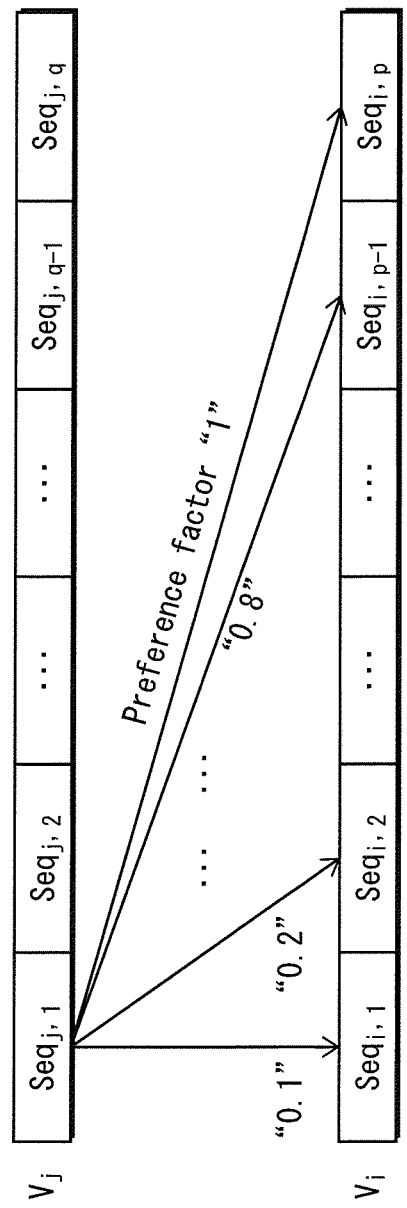
FIG. 2 is a diagram for explaining calculation of frame sequence correspondence using a preference factor.

For each frame of the frame sequence pair, the second detector 101 scales the frame similarity obtained by Formula 2 by using a preference factor, and thus obtains the sequence similarity of the frame sequence pair. For example, the second detector 101 multiplies the acquired sequence similarity by the preference factor, in order to obtain the sequence similarity of the frame sequence pair. The preference factor is weight given to the frame similarity calculated between frame sequences, and is set according to the location of each frame sequence. As shown in FIG. 2 for example, for the $Seq_{j,1}$ which includes the playback start position of the video $V_j$, a preference factor "1" is set in relation with the playback end position of $Seq_{i,p}$ of the video $V_i$. The preference factors to be set to $Seq_{i,p-1}$, $Seq_{i,p-2}$, . . . $Seq_{i,2}$, and $Seq_{i,1}$ gradually approaches 0 with increased distance from the playback end position of the video $V_i$.

Note that sequence similarity calculation is performed by first fixing $Seq_{i,p}$ of the video $V_i$ and then calculating the sequence similarity between $Seq_{i,p}$ and each of $Seq_{j,1}$, . . . , $Seq_{j,q}$ of the video $V_j$. Subsequently, the sequence similarity is sequentially calculated for each of $Seq_{i,p-1}$, . . . , $Seq_{i,1}$ in this order, in relation with each of $Seq_{j,1}$, . . . , $Seq_{j,q}$ of the video Vj.

The second detector 101 detects the sequence pair with the highest sequence similarity (scaled by preference factor) for each candidate pair. The second detector 101 calculates the sequence similarity of the detected sequence pair, as the sequence correspondence $S_{i,j}$.

The second detector 101 detects the sequence pair with the highest sequence similarity (scaled by preference factor) for every candidate pair, and acquires the sequence correspondence for each of the detected sequence pairs. Thus whether video clips can be composed with other videos can be determined.

(2-3) Matching Processor 102

The matching processor 102 detects possible transitions within the video pairs having a high degree of similarity by using the sequence pair detected by the second detector 101. Directly generating frame-level transition will produce unnatural effect. Therefore, the matching processor 102 performs matching to detect frame pairs having a high degree of similarity from among the sequence pairs detected by the second detector 101.

As shown in FIG. 1, the matching processor 102 includes a common pattern detector 110, a human detector 111 and a face detector 112.

The matching processor 102 specifies a candidate of a key frame pair by using the common pattern detector 110, the human detector 111 and the face detector 112. The key frame pair is a pair of frames having a high degree of similarity in the two sequences detected by the second detector 101. The pair of frames as the key frame pair candidate are the frames to be merged in the merged video generated by the merged video generating unit 13 which will be described later.

The matching processor 102 operates one of the common pattern detector 110, the human detector 111 and the face detector 112, or a combination of these detectors.

(2-3-1) Common Pattern Detector 110

The common pattern detector 110 performs salient object matching using local visual pattern detection. Matching using local visual pattern detection is well-known, and is therefore not described here.

The common pattern detector 110 performs common pattern detection for each frame pair included in the correspondence sequence, and selects the frame pair with the maximal pattern support as a key frame pair candidate.

The common pattern detector 110 detects a common pattern (object), such as a toy, a car, or scene, which is common between the sequence pair with a high degree of similarity. This detection is performed based on image matching that is different from matching performed by the second detector 101 based on key points for the sequence matching.

Usually, image matching contains a large amount of outliers, and therefore a robust fitting method is required to find the common pattern. Specifically, common pattern denotes those matching pairs that share the same or similar homogeneous transformation parameters. The common pattern detector 110 uses Graph Shift method to introduce spatial constraint for the matched pair to find a dense common pattern.

(2-3-2) Human Detector 111

The human detector 111 performs human appearance matching by using automatic human body detection based on automatic human localization. Since automatic human body detection is well-known technology, its explanation is omitted.

The part-based model learnt with the annotated human images from dataset for human detection has been stored in the human detector 111 in advance. The human detector 111 performs matching with the prestored part-based model for each frame of the sequence, and detects humans.

Then, the human detector 111 detects a person commonly appearing in the frames of the sequence pair by using the results of the automatic human body detection.

Based on the results of the detection, if a person appearing in a given frame pair has a greater degree of similarity than a predefined threshold, the human detector 111 selects the frame pair as a key frame pair candidate.

Figure 3:
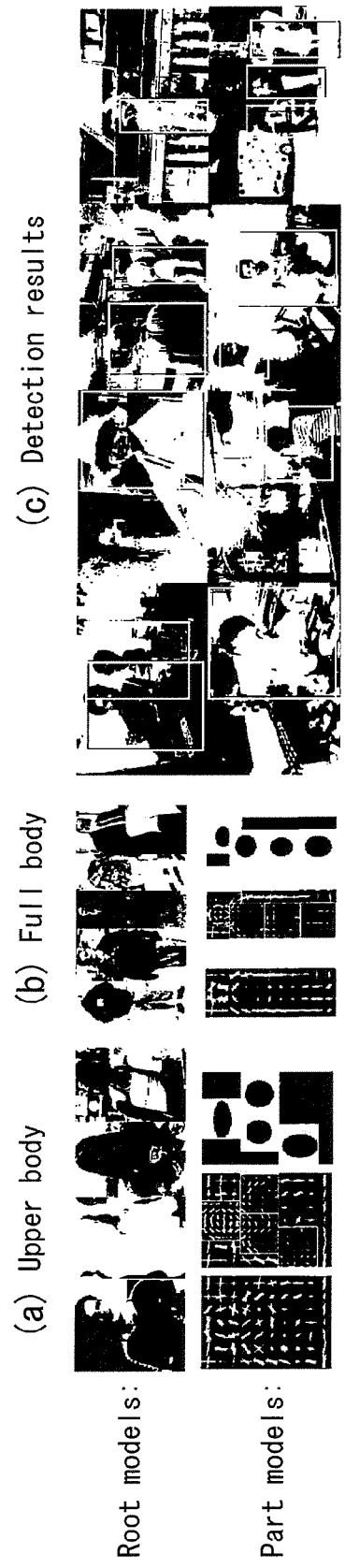
FIG. 3 shows example models used for human detection and example results of human detection.

FIG. 3 shows example part-based models and example results of detection using the models.

The part-based model contains two parts. One describes full view (denoted as root model) and the other describes part views (denoted as part models).

The parts (a) and (b) in FIG. 3 show that the part-based model contains two groups of root models (for upper body and full body respectively) and four part models for each root model. The part (c) in FIG. 3 shows several exemplary detection results over some frames. The appearances of the detected human bodies are represented in color histogram and matched to find the same person appeared in different frames/videos.

Since matching using the part-based model and the matching using the color histogram are well-known technologies, their explanation are omitted here.

(2-3-3) Face Detector 112

The face detector 112 performs face appearance matching by using automatic face detection based on automatic human face localization.

The face detector 112 performs automatic face detection for each frame of the sequence pair. Based on the results of the automatic face detection, if a face appearing in a given frame pair has a greater degree of similarity than a predefined threshold, the face detector 112 selects the frame pair as a key frame pair candidate.

The following shows an example of automatic face detection.

The face detector 112 performs face alignment by using multi-view face detector and active shape model. For each frame, the face detector 112 detects a near-frontal face to localize the face area as well as several facial parts, such as eyes, mouth, and face contour. A frame with face is assumed to be matched with another frame with face according to the following criteria:

Criterion 1) both face areas should be large enough. Small face areas are much less important since video matching and transition on small area frequently lead to unnatural effects. The threshold is set to 3,600 pixels, for example;

Criterion 2) the faces should belong to the same person. The face alignment procedure is performed first to align the faces, and then the Euclidean distance is calculated for the feature vectors extracted from each face pair. A threshold is empirically set to remove most mismatched candidates;

Criterion 3) the two face poses should not vary much. The output of the face detection includes the pose view information. Also, front face matching is preferable than non-front face matching.

Figure 4:
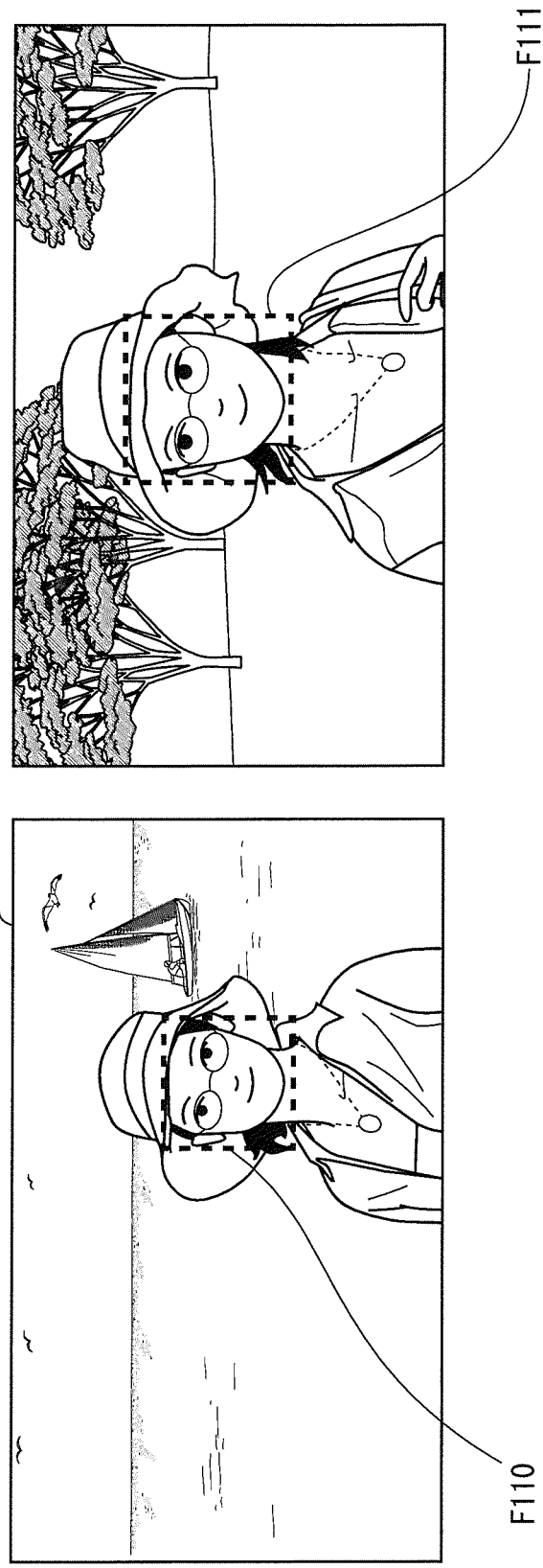
FIG. 4 shows an example of matching by face detection.

FIG. 4 shows an example of matching by face detection. The face areas F110 and F111 in frames F100 and F101 are larger than a predefined size, and Criterion 1 is fulfilled. Also, the faces appearing in the face areas F110 and F111 belong to the same person, and Criterion 2 is fulfilled. Finally, the face poses in the face areas F110 and F111 are almost the same, and Criterion 3 is fulfilled.

Therefore, the face detector 112 detects the face of the same person from the frames F100 and F101.

(3) Graph Generating Unit 12

For N video clips $(V_1, V_2, \ldots, V_n)$ stored in the video storage unit 10, the graph generating unit 12 generates a weighted directed matching graph G=(V, E) by using a sequence pair detected by the second detector 101 and the sequence correspondence of the sequence pair. V denotes a node (video), and E denotes an edge with a directed weight. Here, the directed weight of edge E is represented by $E_{i,j}$, and it shows the weight directed from the video $V_i$ to the video $V_j$. The value represented by $E_{i,j}$ is the value calculated based on the sequence correspondence $S_{i,j}$ of the sequence pair detected by the second detector 101. The method for calculation will be described later. Note that the directed weight may be referred to as an edge.

The graph generating unit 12 finds an optimal path P from the weighted directed graph G. The following criteria are considered to find a path over the graph:

(Criterion 1) Continuity: Each edge on the path should have a weight greater than a predefined threshold. Otherwise, the edge will not be selected.

(Criterion 2) Completeness: The overall path should be sufficiently long. To ensure the completeness of the video, large number of combined clips is preferred. The method of finding the longest path will be described later.

(Criterion 3) Diversity: The nodes should have large variety. Since the matched clips possibly contain many near-duplicate versions, it is necessary to exclude them to retain the compactness of the composite video. The diversity can be accomplished by exploring the similarities among videos. That is, as the similarities among videos, candidate pairs are detected by PmH scheme, and four candidate pairs are detected for each video. Consequently, each video can be followed by any of the four candidates, and thus the diversity can be accomplished. Upon selection of one of the candidates as the path, the edge weight for the path is scaled in the following manner so that the selected path will be excluded from the subsequent path finding.

The following explains the functions of the graph generating unit 12 in detail.

As shown in FIG. 1, the graph generating unit 12 includes a graph constructor 120, an edge pruner 121, and a path detector 122.

(3-1) Graph Constructor 120

The graph constructor 120 gives a directed weight to each of the video candidate pairs selected by the first detector 100, by using the sequence correspondence corresponding to the candidate pair calculated by the second detector 101. Consequently, a directed edge is added to each video pair, and thus the matching graph G with a directed weight is generated. The following explains the functions of the graph constructor 120 in detail, assuming the candidate pairs as video Vi and video Vj.

The graph constructor 120 calculates a directed weight $E_{i,j}$ directed from the video Vi to the video Vj by using the sequence correspondence $S_{i,j}$ calculated for the video Vi and the video Vj by the second detector 101, and the following Formula 4.

[Math. 4]

$$E_{i,j} = \begin{cases} \dfrac{S_{i,j}}{W_{i,j}} & \text{if } S_{i,j} \geq \theta \\ 0 & \text{otherwise} \end{cases} \quad \text{(Formula 4)}$$

$W_{i,j}$ denotes the value calculated for the video Vi and the video Vj by Formula 1 above. $\theta$ denotes the average of the values calculated for all the candidate pairs by Formula 1.

(3-2) Edge Pruner 121

The input to the edge pruner 121 is the graph G with a directed weight constructed by the graph constructor 120. The edge pruner 121 detects a cyclic path contained in the graph G, and prunes (i.e. removes) at least one of the edges constituting the detected cyclic path. Thus, videos having similarities and merged into a single video are prevented from being played back repeatedly.

Specifically, the edge pruner 121 uses Depth-First-Search to detect cycles in the graph G. Among the edges constituting the detected cyclic path, the edge pruner 121 removes the edge with the smallest directed weight from the graph G. Depth-First-Search is well-known technology, and its explanation is omitted here.

(3-3) Path Detector 122

The input to the path detector 122 is the graph G which has undergone the edge pruning performed by the edge pruner 121. The path detector 122 detects one or more appropriate paths from the graph G which has undergone the edge pruning.

The path detector 122 detects the longest path P from the graph G=(V, E). Here, it is known that the longest path problem in the graph theory can be converted to the shortest path problem by exploiting the duality of optimizations. When the input graph to the longest path problem is G, the shortest simple path on the graph G' is exactly the same as G but with inverse edge weights. However, positive-weight cycles in the original graph G lead to negative-weight cycles in G'. Finding the shortest simple path on a graph with negative-weight cycle is therefore also NP-complete. If G contains no cycles, G' will have no negative-weight cycle, and any shortest-path finding algorithm can be implemented on G to solve the original problem in polynomial time. The longest path program on a graph having no cyclic path can be easily solved on acyclic graphs. In the present embodiment, the graph G after the edge pruning does not have cyclic path, owing to the functions of the edge pruner 121. Therefore, the longest path P can be found by detecting the shortest path from G' with the inverse of the edge weighs of the graph G after the pruning, instead of detecting the longest path P from the graph G after the pruning.

There are several schemes for generating the longest path.

Figure 5:
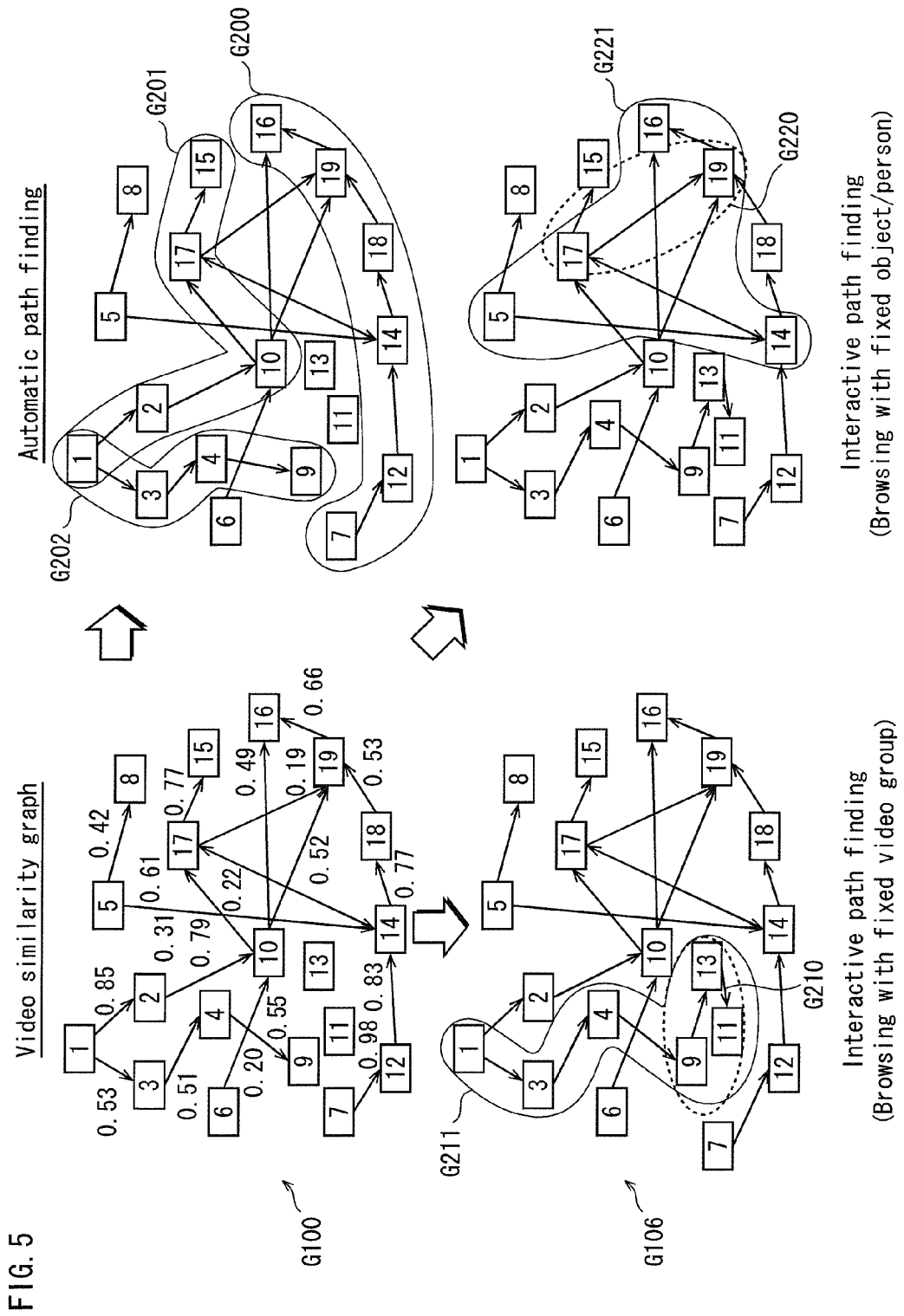
FIG. 5 shows an example of a video similarity graph G100 and example results of path finding.

FIG. 5 shows the results of the path finding (i.e. path detection) from the graph G100 after the pruning (i.e. video similarity graph) according to automatic path finding, interactive path finding (with a fixed video group), and interactive path finding (with a fixed object). The following explains these schemes.

(3-3-1) Automatic Path Finding

This scheme automatically finds one or more maximal paths. The path detector 122 detects, from the graph G, the longest path where each directed weight (i.e. each edge) is equal to or greater than a predetermined value. Then, the path detector 122 scales (multiplies) all the directed weights (i.e. edge weights) given to the nodes in the path by a factor λ (e.g. λ0=0.2), in order to reduce the possibility for these nodes to be selected again. Then, the path detector 122 finds the longest path again in the updated graph. This procedure can be iterated until reaching the criterion that the sum of weights in the final path is less than a threshold.

The following explains an example case of obtaining the longest path composed of edges with edge weights of 0.5 or greater from the video similarity graph G100 shown in FIG. 5. First, the path detector 122 detects the path G200 composed of the nodes 7, 12, 14, 18, 19 and 16 connected in this order, as the longest path composed of edges with edge weights of 0.5 or greater. Then, the path detector 122 multiplies each edge weight in the path G200 by λ(=0.2). As a result, the weights of these edges will be smaller than 0.5, and these edges will not be detected again by the path finding. After that, the path detector 122 detects the path G201, and scales the weights of the edges in the path G201 in the same manner as the path G200. After that, the path detector 122 detects the path G202, and performs the scaling for the path G202 in the same manner.

Figure 6:
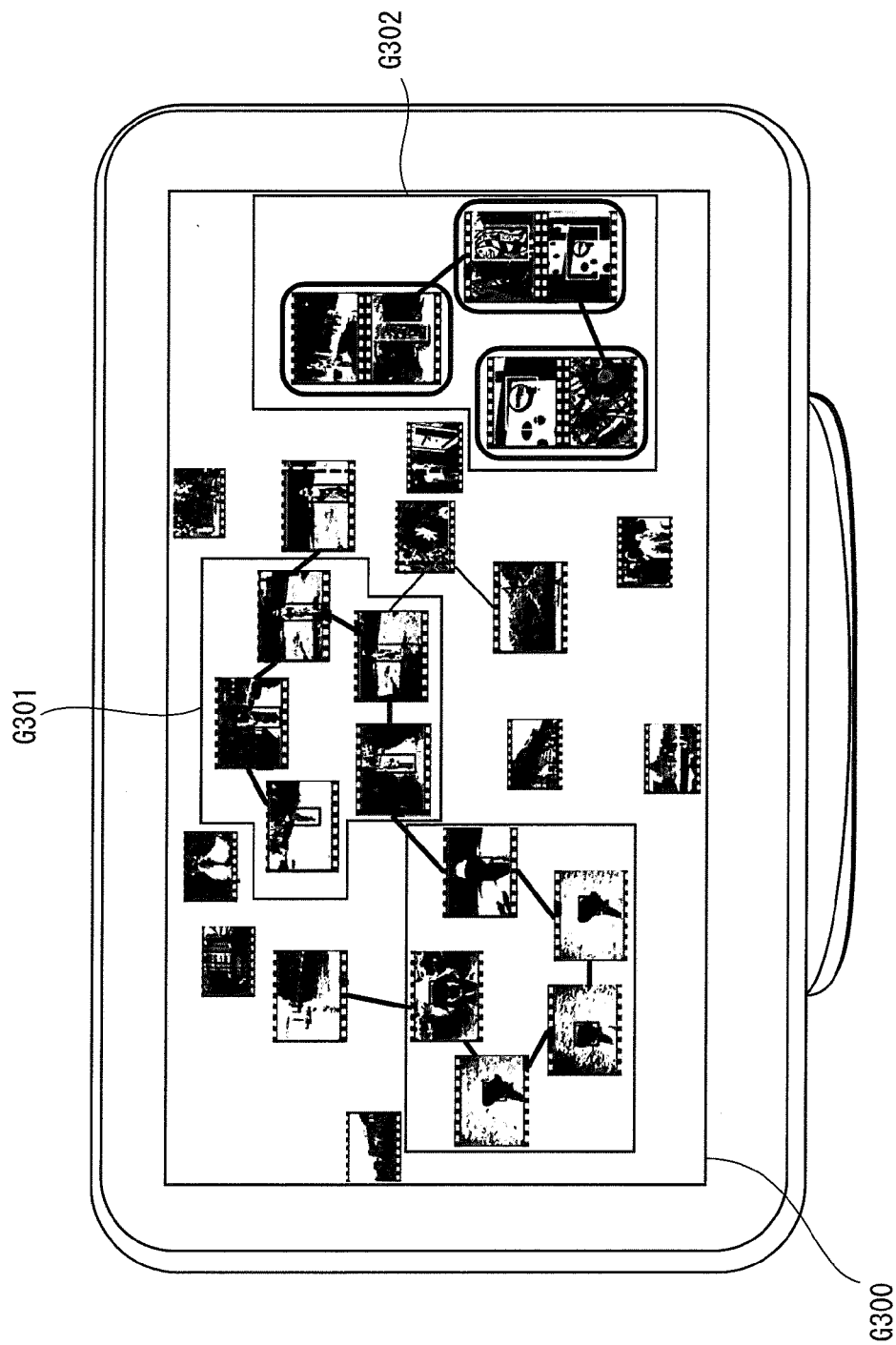
FIG. 6 shows an example interface for presenting the results of automatic path finding to a user.

FIG. 6 shows an example interface presented to a user. This example shows that there are three longest paths (i.e. Video Puzzles) G300, G301 and G302 after the system automatically finds the path for group of video clips. Here, the linkage between two video clips, represented as the edge, indicates the similarity of them and the thickness of the edge indicates how similar they are. For example, whenever the user presses an indicator of the Video Puzzle G300, G301 or G302, the composite one-shot video will be played back for the user by using the video clips constituting the video puzzle whose indicator is pressed.

(3-3-2) Interaction Based Finding

For personal usage, interaction based finding is used for find and compose consecutive video clips with human interaction. This path finding scheme is effective when a user expects a one-shot video that contains a specified video clip or focuses on a specific object or scene.

(a) when Video Clips are Fixed by a User

In this case, the path finding is performed for detecting the longest path from one node to another node, including a video clip (node $V_i$) specified by the user. Since the constructed graph is an acyclic graph, it is guaranteed that no node will be selected more than once. Note that the number of video clips to be specified by the user may be one or more. When a plurality of video clips are selected by the user, the longest path including all the specified video clips will be detected. In addition one video clip specified by the user may be located at the beginning of the longest path or the end of the longest path.

For example, the following explains the case where the nodes (video clips) 9, 11 and 13 in the video similarity graph G100 shown in FIG. 5 are specified by the user.

The path detector 122 generates a path composed of the specified nodes. For example, the path detector 122 generates the path G210 composed of the node 9, the node 13 and the node 11 connected in this order. After that, the path detector 122 detects the longest path to the node 9 (i.e. the path connecting the nodes 1, 3, 4 and 9 in this order). The path detector 122 also searches for the longest path starting from the node 11. If this is the case, since there is no similar node to the node 11, the path detector 122 does not detect the longest node starting from the node 11. The path detector 122 merges the detected path (i.e. the path connecting the nodes 1, 3, 4 and 9 in this order) with the generated path G210, and thereby generates the final longest path G211 (i.e. the path connecting the nodes 1, 3, 4, 9, 13 and 11 in this order).

When only one node is specified by the user (assume $V_k$ as the specified node), the path detector 122 detects the longest path from a node $V_i$ to the node $V_k$ and the longest path from the node $V_k$ to another node $V_j$, and merge the detected paths, thereby generating a single longest path (the path connecting $V_i$, $V_k$, and $V_j$ in this order). When there is no longest path from a node $V_i$ to the node $V_k$, the path detector 122 generates a path from $V_k$ to $V_j$. When there is no longest path from the node $V_k$ to the other node $V_j$, the path detector 122 generates a path from $V_j$ to $V_k$.

Figure 7:
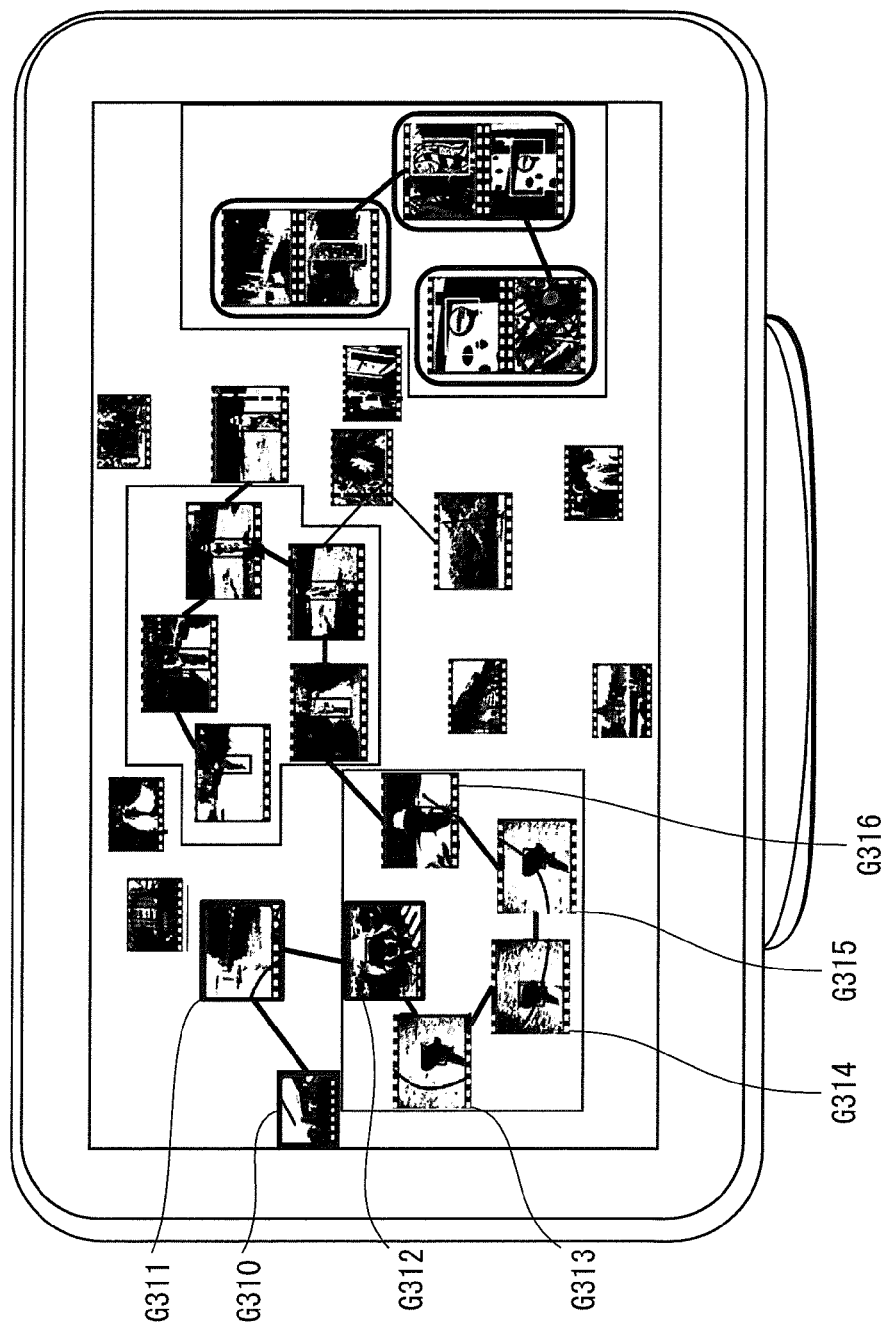
FIG. 7 shows an example interface for presenting the results of path finding when video clips are fixed by a user.

FIG. 7 shows an example interface presented to a user when three video clips are fixed by the user. In this example, video clips G310, G311 and G312 have been selected according to specification by the user. In this example, the path detector 122 generates a path composed of the specified video clips (nodes) G310, G311 and G312, such as path connecting G310, G311 and G312 in this order. The path detector 122 searches for the longest path starting from the video clip G312, and as a result, detects the path connecting the video clips G312, G313, G314, G315 and G316 in this order. Since there is no similar video clip to the video clip G310, the path detector 122 does not detect a path to the video clip G310. The path detector 122 merges the path consisting of the specified video clips and the detected path, and thereby generates a single longest path (the path connecting the video clips G310, G311, ..., and G316 in this order).

(B) when Objects are Fixed by a User

In this case, the path finding is performed for detecting a one-shot video including an object specified by the user.

The path detector 122 specifies two videos $V_i$ and $V_j$ including the object selected by the user. Then, the path detector 122 searches for the longest path starting with the specified node $V_i$ and ending with the specified node $V_j$.

For example, the following explains the case where an object in the video similarity graph G100 shown in FIG. 5 is specified by the user, and furthermore, the nodes 17 and 19 including the specified object are specified by the user.

The path detector 122 detects the node 5 and the node 16, each including the specified object. Then, the path detector 122 searches for the longest path from the node 5 to the node 16, including the path G220 consisting of the nodes 17 and 19, and also including the specified object in the course of the path. In this example, the path detector 122 detects the path G211 as a result of the search.

Note that at least one of the nodes 5 and 16 including the specified object may be located in the course of the longest path. If this is the case, when the path including both node 5 and node 16 in the course is to be detected, the path detector 122 generates the path composed of the node 5 and the node 16 in the manner similar to the case where video clips are fixed, and then generates the longest path connecting to the generated path and the longest path extending from the generated path. The path detector 122 merges these three paths. When detecting the longest paths, the path detector 122 detects the path that includes the specified object or the object that is different from the specified object but is include in the generated path (the path composed of the node 5 and the node 16).

Figure 8:
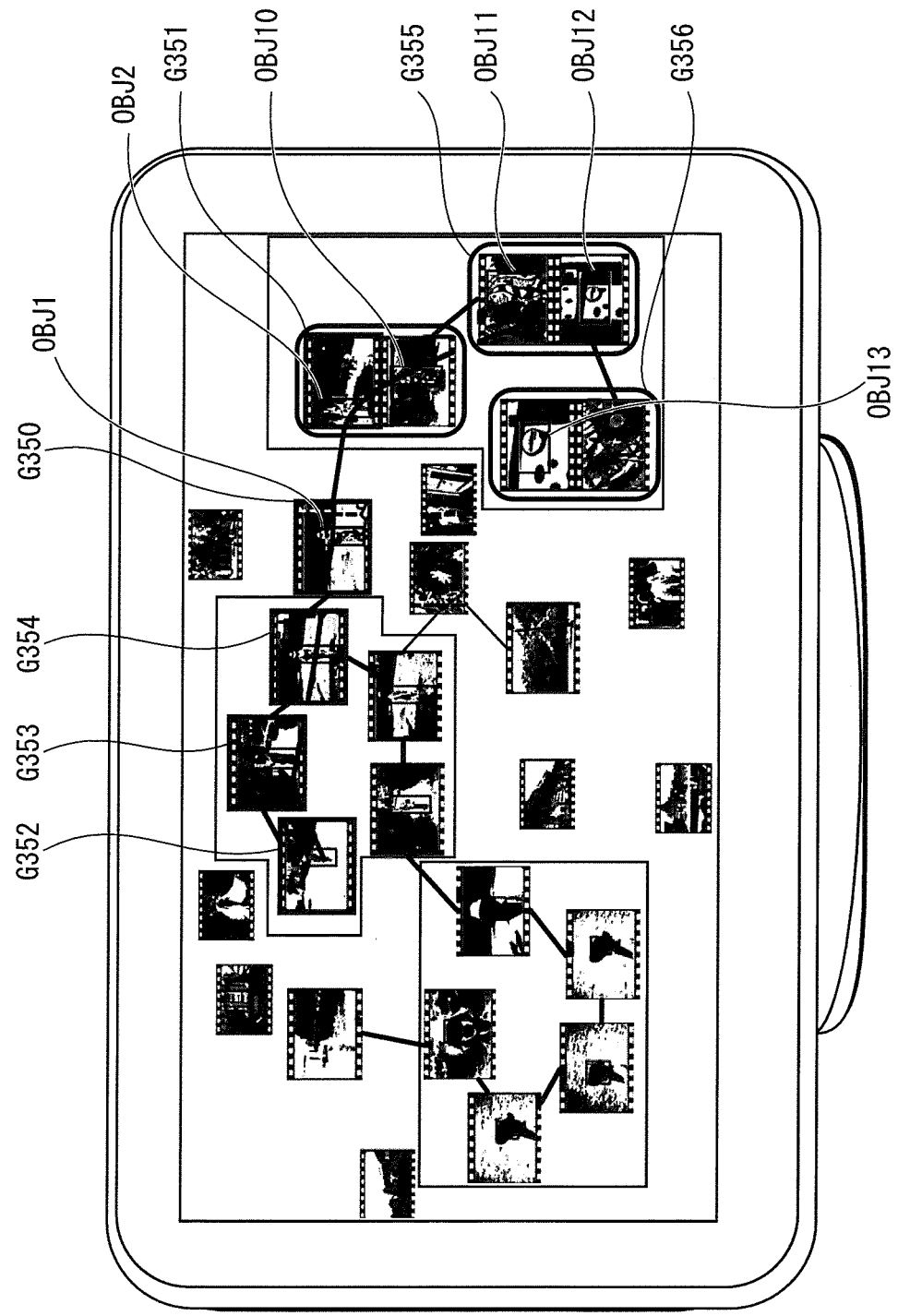
FIG. 8 shows an example interface for presenting the results of path finding when objects are fixed by a user.

FIG. 8 shows an example interface to be presented to a user when objects are fixed by the user. In this example, a person OBJ1 and a person OBJ2 commonly included in the video clips G350 and G351 have been selected according to specification by the user.

The path detector 122 searches for the longest path including the selected people and connected to the video clip G350. For example, the path detector 122 detects the path connecting the video clips G352, G353, G354 and G350 in this order. Since there is no video clip that includes the people commonly included in the video clips G350 and G351 and that follows the video clip 351, the path detector 122 searches for a video clip that includes another object OBJ10 included in the video clip G351 and that follows the video clip G351. As a result, the path detector 122 detects the video clip G355 that includes the object OBJ11 that is similar to the object OBJ10. Since there is no video clip that includes the object similar to the objects OBJ10 and OBJ11 and that follows the video clip G355, the path detector 122 searches for a video clip that includes another object OBJ12 included in the video clip G355 and that follows the video clip G355. As a result, the path detector 122 detects the video clip G356 that includes the object OBJ13 that is similar to the object OBJ12.

Finally, the path detector 122 generates the longest path connecting the video clips G352, G353, G354, G350, G351, G355 and G356 in this order.

(4) Merged Video Generating Unit 13

The merged video generating unit 13 merges the video clips located on the path detected by the path detector 122 to generate a one-shot video.

Directly generating frame-level transition will cause visual interruptions and produce unnatural effect. When the key frame pair is specified by the matching processor 102, it is possible to simply merge the key frames. However, for each of the two frames as the key frame pair candidate, all the matches are local, such as common patterns, human bodies, and faces. Directly stitching the two videos based on these two frames may lead to abrupt change, and this also produces unnatural effect.

(The Case where a Key Frame Pair Candidate Exists)

In view of the above, when a key frame pair candidate is specified between two adjacent videos on the path detected by the path detector 122, the merged video generating unit 13 merges the two videos by using the specified key frame pair candidate so as to produce a natural transition between the videos. In this regard, when merging the video $V_j$ and the video $V_i$ so that the video $V_j$ follows the video $V_i$, the merged video to be generated by the merged video generating unit 13 does not contain only the frame sequence $Seq_{i,s}$ and the frame sequence $Seq_{j,t}$ including the frames as the key frame pair candidate. That is, the merged video to be generated by the merged video generating unit 13 also contains a portion that is continuous in terms of time with the frame sequence $Seq_{i,s}$ and precedes the frame sequence $Seq_{i,s}$ (this portion is hereinafter referred to as the preceding portion) and a portion that is continuous in terms of time with the frame sequence $Seq_{j,t}$ and succeeds the frame sequence $Seq_{j,t}$ (this portion is hereinafter referred to as the subsequent portion). In addition, in the merged video, the preceding portion, the frame sequence $Seq_{i,s}$, the frame sequence $Seq_{j,t}$, and the subsequent portion are merged in this order.

Specifically, the merged video generating unit 13 applies image morphing to the key frames as the key frame pair candidate, and merges the two videos corresponding to the key frame pair.

Image morphing is often used for realizing the transition in video animation. The goal of the morphing is to generate in-between geometry which smoothly transforms the source shape into the target shape with interpolated texture smoothing The merged video generating unit 13 generates a merged video with image morphing according to the following steps.

(Step 1) Finding the minimum matched area: the transition between two matched objects often needs to be smooth and continuous. Thus, instead of simply generating a transition between the frames $F_k$ and $F_l$ as the key frame pair candidate in the similar videos $V_i$ and $V_j$, a transition between the minimum matched areas are generated. Here, $F_k$ denotes the $k^{th}$ frame in the video $V_i$, and $F_l$ denotes the frame in the video $V_j$. The merged video generating unit 13 selects the minimum matched areas by taking the following three factors in consideration to guarantee the smoothness: (Step 1-1) Determining the width-height ratio of the area to be detected. The width-height ratio to be determined is the same for the video $V_i$ and be video $V_j$. (Step 1-2) Determining whether the area with the determined width-height ratio covers most of local matched points, and when it is determined that the area covers the most of local match points, detects the area with the determined width-height ratio as the minimum matched area. When the minimum matched area cannot be detected with the area with the width-height ratio determined in Step 1-1, the width-height ratio is determined again in Step 1-1, and the minimum matched area is searched for by using the area with the width-height ratio determined again. (Step 1-3) The offset between the centers of the local matched points within the minimum matched areas for the frames $F_k$ and $F_l$ is minimized.

(Step 2) Focusing on the matched object: after specifying the minimum matched area, the merged video generating unit 13, searches for m frames preceding the frame $F_k$ of the video $V_i$, and applies a zoom-in scheme to the matched object contained in the sequence composed of the m frames and the frame $F_k$. Here, m is determined by the area ratio between the frame $F_k$ and the minimum matched area specified with the frame $F_k$. Similarly, the merged video generating unit 13 searches for n frames subsequent to the frame $F_l$ of the video $V_j$, and applies a zoom-out scheme to the matched object contained in the sequence composed of the n frames and the frame $F_l$. Here, m is determined by the area ratio between the frame $F_l$ and the minimum matched area specified with the frame $F_l$.

(Step 3) Performing local alignment and local texture shape mapping: the merged video generating unit 13 performs morphing between the minimum matched areas for the frames $F_k$ and $F_l$ to generate the intermediate frames. Given the matching points set for the matched object, the merged video generating unit 13 first generates the Delaunay triangulation sets. Next, the merged video generating unit 13 computes the intermediate triangle by using the elements corresponding to the Delaunay triangulation sets. Then, the texture within the triangulation is linear interpolated. Linear interpolation using the Delaunay triangulation sets is well-known, and is therefore not described here.

(Step 4) Feathering on unmatched area: the transition between the minimum matched areas may still have some ghost effect for the unmatched area. Hence, the merged video generating unit 13 applies the feathering approach, which is commonly used for image mosaics, to the unmatched area. That is, the merged video generating unit 13 weights the pixels in each frame proportionally to edge and their distance to the matching points center.

(The Case where No Key Frame Pair Candidate Exists)

The following explains the case where there is no key frame pair candidate between the two videos. This case is regarded as "out-of-context" composition, and the merged video generating unit 13 applies direct composition.

As an alternative to the direct composition, the merged video generating unit 13 may apply other transition methods, such as fade-in and fade-out, or use the Picture-in-Picture technique. When using the Picture-in-Picture technique for two videos, the merged video generating unit 13 connects the two videos through finding a flat area in the end part of the former video and then embeds the latter video into this area with a virtual TV frame. The transition can be made through zoom-into the TV frame.

(4-1) Specific Examples

Morphing can produce appealing result for matched objects, but it may also cause the ghost phenomenon in transition for unmatched parts. Since the present embodiment is based on matching between partial areas of frames, it is likely to cause the ghost phenomenon. In view of the above, it is possible to avoid the ghost phenomenon by performing the feathering on the unmatched area.

Figure 9:
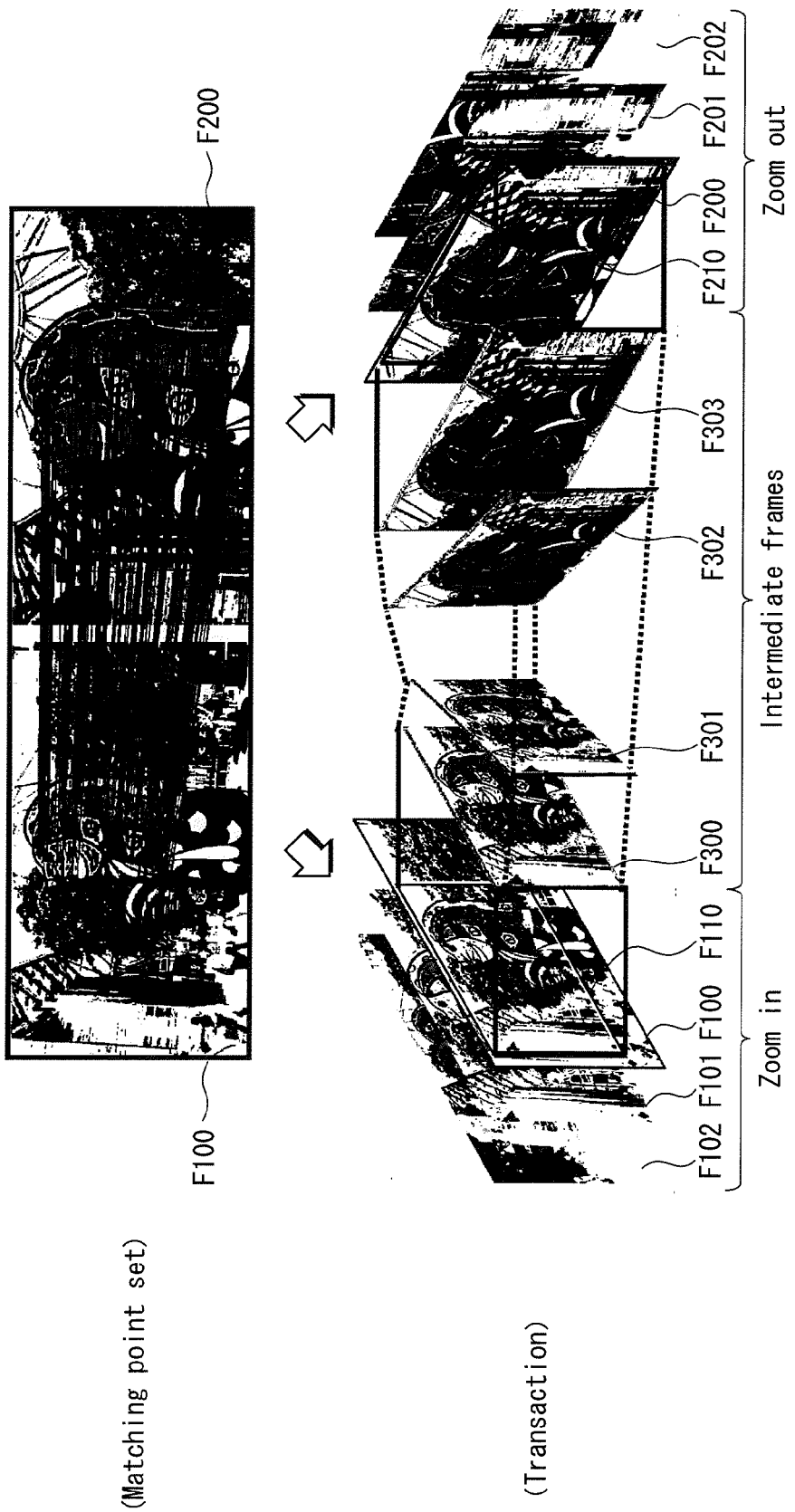
FIG. 9 is a diagram explaining processing procedures for merging a video $V_i$ and a video $V_j$.

FIG. 9 shows specific example of the above-described Steps 1 through 3 for merging the video $V_i$ and video $V_j$.

The merged video generating unit 13 detects the minimum matched area between the video $V_i$ and the video $V_j$. In FIG. 9, the area F110 contained in the image (frame) F100 of the video $V_i$ and the area F210 contained in the image (frame) F200 of the video $V_j$ are detected as the minimum matched areas. This process corresponds to the above-described Step 1.

Focusing on the detected minimum matched area F110, the merged video generating unit 13 applies a zoom-in scheme to the frame F100 and the predetermined number of frames preceding the frame F100, namely frames F101 and F102. Focusing on the detected minimum matched area F210, the merged video generating unit 13 applies a zoom-out scheme to the frame F200 and the predetermined number of frames preceding the frame F200, namely frames F201 and F202. This process corresponds to the above-described Step 2.

Next, the merged video generating unit 13 detects matching point sets in the respective minimum matched areas F110 and F210 of the frames F100 and F200. The matching points sets are the pairs of end points of the line segments connecting the frames F100 and F200 shown at the upper tier in FIG. 9. Using the detected matching points sets, the merged video generating unit 13 generates the intermediate frames F300, F301, ..., F302, and F303. This process corresponds to the above-described Step 3.

Figure 10:
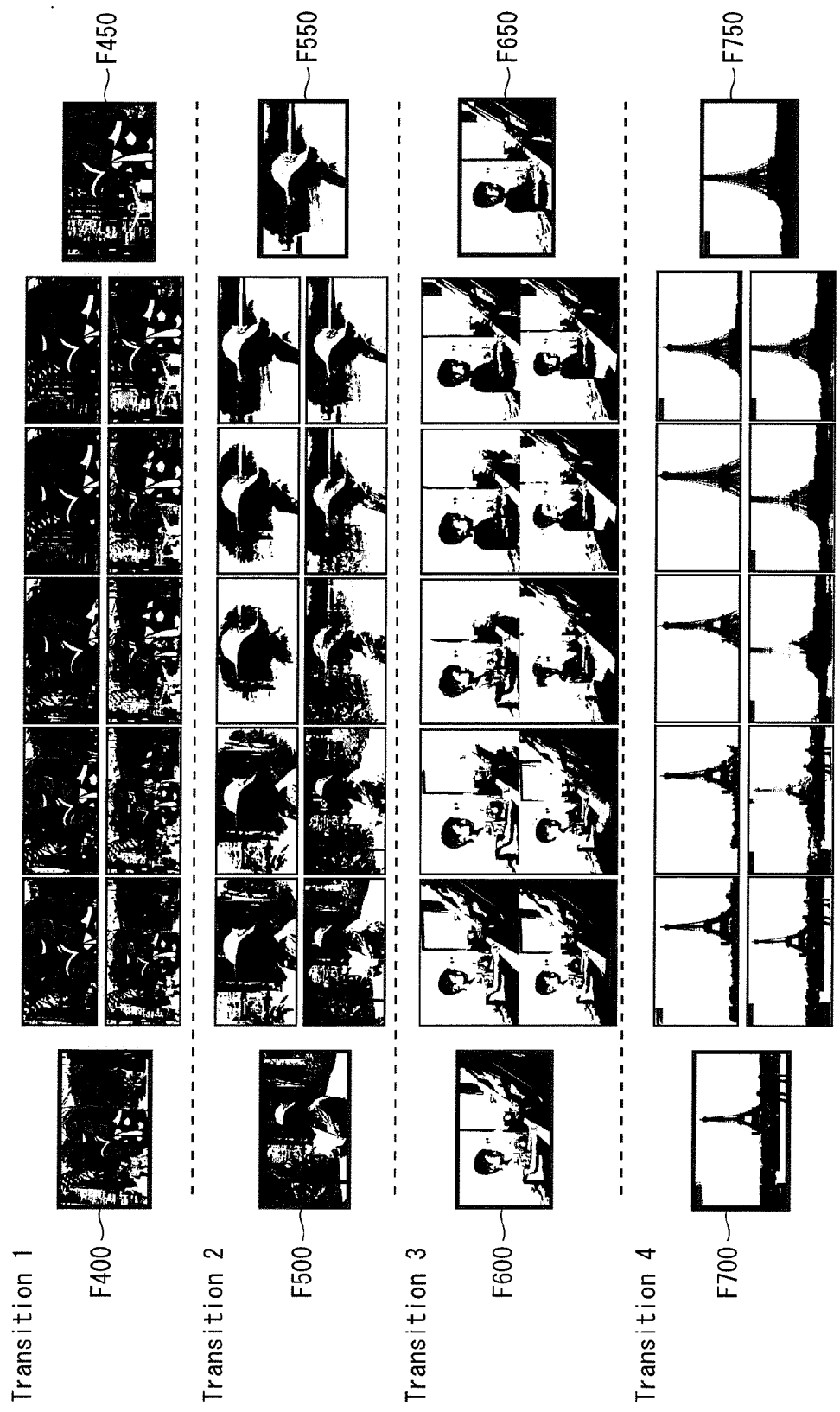
FIG. 10 is an example diagram comparing a transition according to an embodiment pertaining to the present invention with transitions according to other schemes.

FIG. 10 is an example diagram comparing a transition according to the present embodiment applied to a family/scene video clip with transitions according to other schemes.

In FIG. 10, the pairs of frames at the ends of the transitions 1 through 4 (i.e. the pair of frames F400 and F450, the pair of frames F500 and F550, the pair of frames F600 and F650, and the pair of frames F700 and F750) are the matched start and end frames. The first row of each transition (e.g. five frames selected) is obtained by the proposed scheme according to the present embodiment. The second row of each transition is obtained through the widely-used transition effect (fade-in/fade-out is adopted in this example).

The transition 1 is generated through matched key points without feathering effect. The transitions 2 through 4 are obtained using the proposed method with different transition clues. For example, the transition 2 uses a human face, the transition 3 uses a human body (an upper body), and the transition 4 uses a building (a tower), as their respective transition clues.

1.3 Operations (1) Overview of Operations

Figure 11:
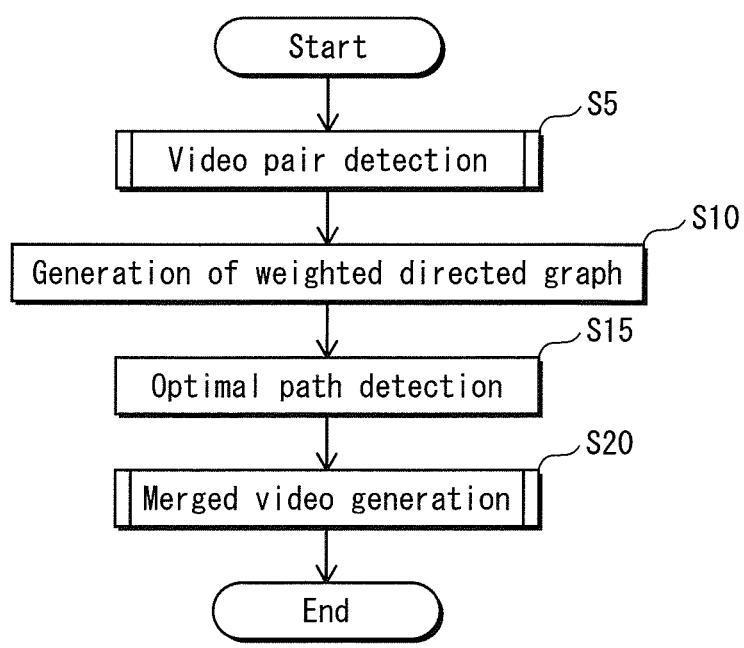
FIG. 11 is a flowchart showing an outline of processing procedures performed by the image processing device 1.

The following explains the overview of the operations performed by the image processing device 1 with reference to the flowchart shown in FIG. 11.

The detection unit 11 detects a pair of similar video clips from among a plurality of video clips stored in the video storage unit 10 (Step S5). This process will be described later in detail.

The graph generating unit 12 generates a weighted directed graph by using the pair of video clips detected in Step S5 and the similarity between them (Step S10).

The graph generating unit 12 detects an optimal path from the generated weighted directed (Step S15).

The merged video generating unit 13 merges the video clips located on the path detected in Step S15, and thereby generates a one-shot video (Step S20). This process will be described later in detail.

(2) Video Pair Detection

Figure 12:
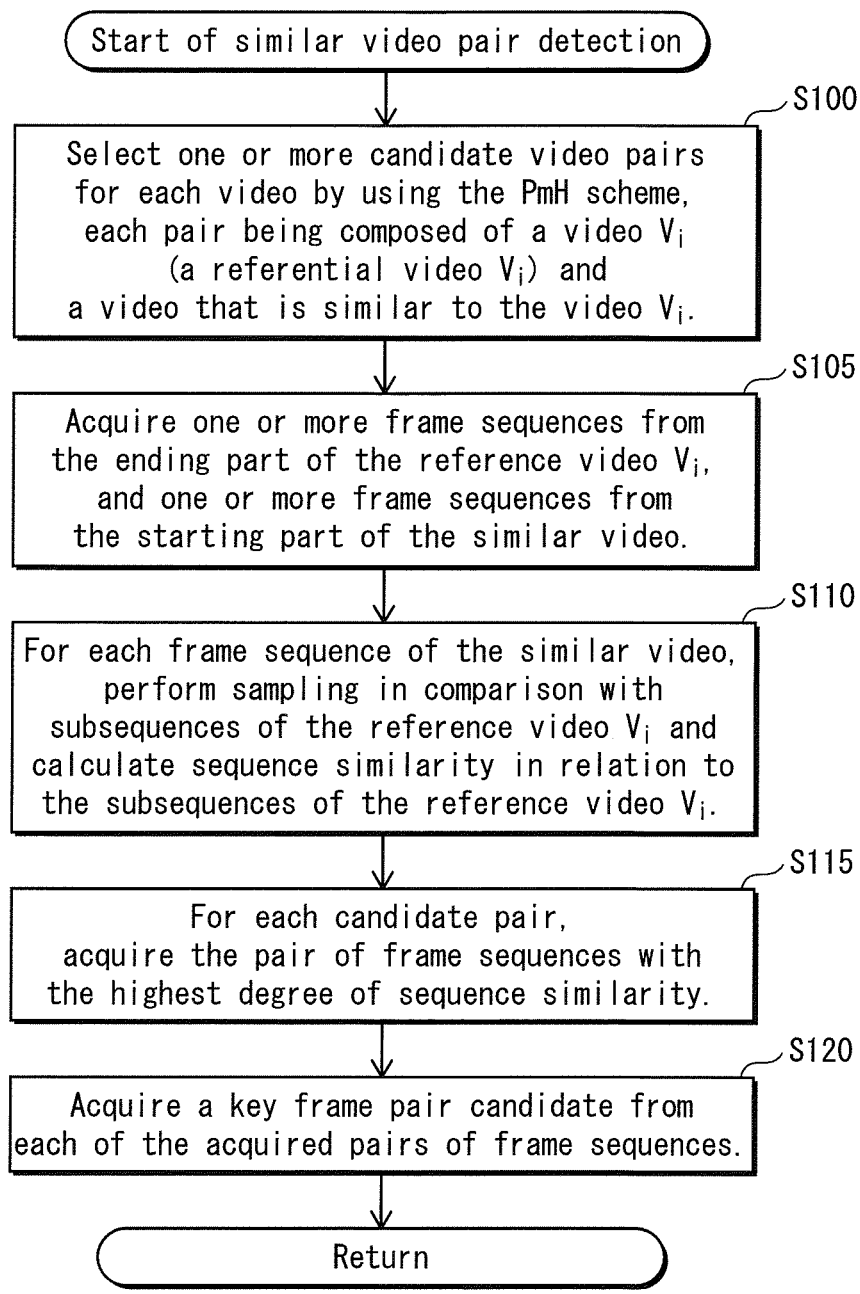
FIG. 12 is a flowchart showing processing procedures for detecting similar video pairs.

The following explains the video pair detection performed in Step S5 shown in FIG. 11, with reference to the flowchart shown in FIG. 12.

Using the PmH scheme, the first detector 100 selects one or more candidate video pairs from among the videos stored in the video storage unit 10 (Step S100). Each candidate video pair is composed of a video $V_i$ (a referential video $V_i$) and a video that is similar to the video $V_i$.

With regard to each of the selected candidate pair, the second detector 101 acquires one or more frame sequences from the ending part of the reference video $V_i$, and one or more frame sequences from the starting part of the similar video (Step S105). Here, the one or more frame sequences acquired from the ending part of the reference video $V_i$ have the same size as the one or more frame sequences acquired from the starting part of the similar video.

For each frame sequence of the similar video, the second detector 101 performs sampling in comparison with each frame sequence of the reference video by using a predetermined constant rate. Using the results of the sampling and the preference factor assigned to the pair of the similar video subsequence and the reference video subsequence which have undergone the sampling, the second detector 101 calculates the similarity between the frame sequences (Step S110).

For each candidate pair, the second detector 101 acquires the pair of frame sequences with the highest degree of similarity (Step S115).

The matching processor 102 acquires a key frame pair candidate from each of the acquired pairs of frame sequences (Step S120).

(3) Merged Video Generation

Figure 13:
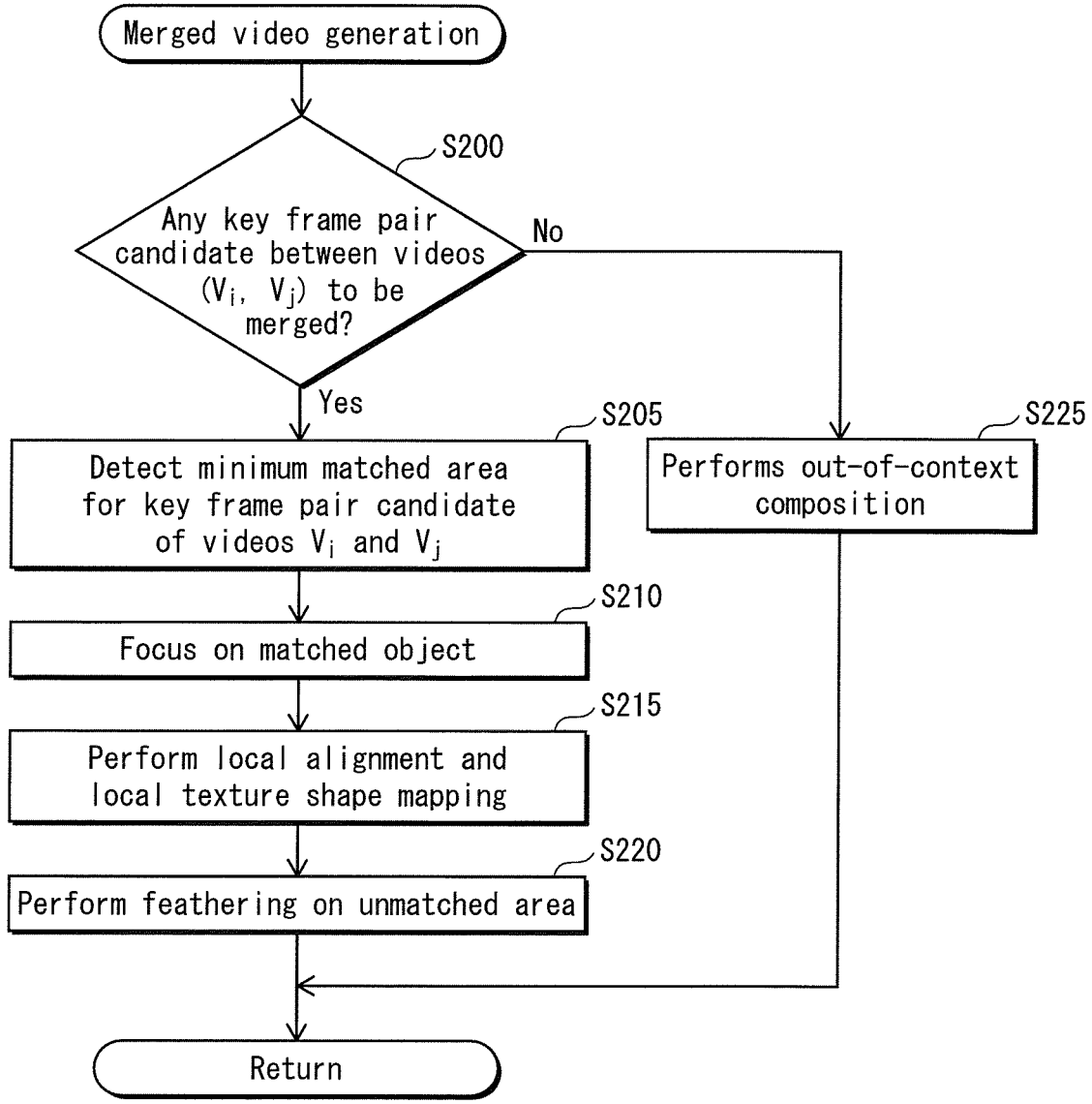
FIG. 13 is a flowchart showing processing procedures for merged video generation.

The following explains the merged video generation performed in Step S20 shown in FIG. 11, with reference to the flowchart shown in FIG. 13. In the following, suppose that the videos to be merged are video $V_i$ and video $V_j$, and the graph is directed from $V_i$ to $V_j$.

The merged video generating unit 13 determines whether or not a key frame pair candidate has been acquired in Step 120 shown in FIG. 12, as for the videos to be merged, i.e., adjacent nodes (videos) on the longest path detected in Step S15 shown in FIG. 11. That is, the merged video generating unit 13 determines whether a key frame pair candidate exists between adjacent nodes (videos) on the longest path (Step S200).

When determining that the key frame pair candidate exists ("YES" in Step S200), the merged video generating unit 13 detects the minimum matched area of the matched object for each of the videos to merged, by using the key frame pair candidate (Step S205).

Within the detected minimum matched area, the merged video generating unit 13 focuses on the matched object in the videos $V_i$ and $V_j$ (Step S210). Specifically, when the frame $F_k$ of the video $V_i$ and the frame $F_l$ of the video $V_j$ are the key frame pair candidate for example, the merged video generating unit 13 searches for m frames preceding the frame $F_k$ of the video $V_i$, and applies the zoom-in scheme to the matched object contained in the frame sequence composed of the m frames and the frame $F_k$. The merged video generating unit 13 also searches for n frames subsequent to the frame $F_l$ in the video $V_j$, and applies the zoom-out scheme to the matched object contained in the frame sequence composed of the n frames and the frame $F_l$.

The merged video generating unit 13 performs the local alignment and the local texture shape mapping (Step S215). Specifically, the merged video generating unit 13 applies morphing between the largest matched sub-windows of the frames $F_k$ and $F_l$ as the key frame pair candidate to generate the intermediate frames.

The merged video generating unit 13 performs feathering on unmatched area (Step S220). Specifically, the merged video generating unit 13 applies the feathering approach, which is commonly used for image mosaics, to the unmatched area.

When determining that no key frame pair candidate exist, ("NO" in Step S200), the merged video generating unit 13 performs "out-of-context" composition, such as direct composition (Step S225).

1.4 Specific Examples

Figure 14:
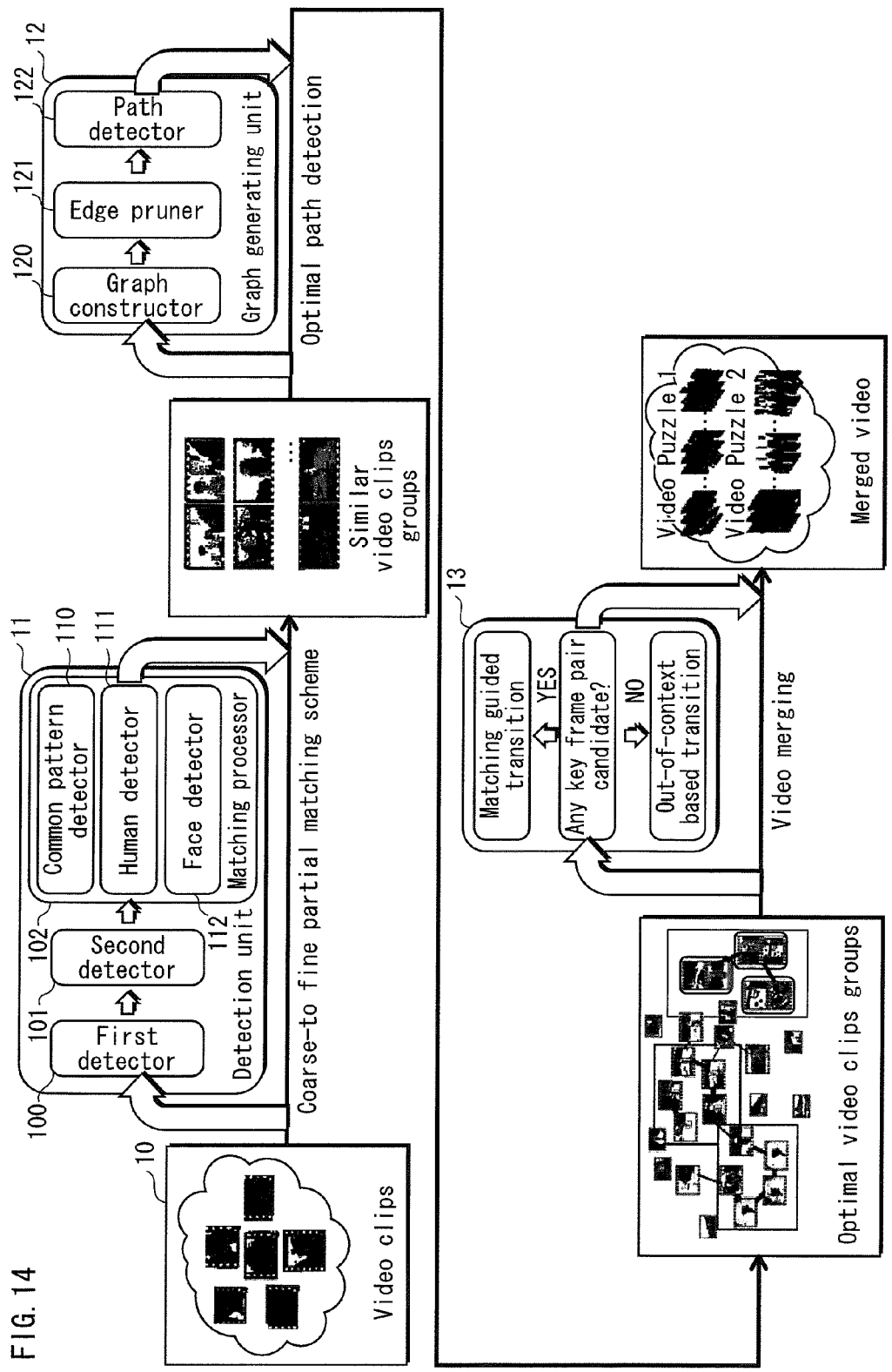
FIG. 14 explains processing performed by the image processing device 1 based on a specific example.

The following explains the operations performed by the image processing device 1 with reference to the specific example shown in FIG. 14.

The plurality of video clips stored in the video storage unit 10 are input to the detection unit 11.

Then, the detection unit 11 detects a similar video pair by a coarse-to-fine partial matching scheme. Specifically, the first detector 100 of the detection unit 11 detects a similar video pair by the PmH scheme in a coarse manner. From each video of the video pair found by the coarse detection, the second detector 101 detects similar sequences according to the frame similarity. After that, the matching processor 102 detects a matched object between the most similar sequences according to the frame similarity. As a result of the processing performed by the detection unit 11, a group of similar video clips are formed, parts (i.e. sequences) with a high degree of similarity contained in the similar video clips are specified, and a matched object in the parts with a high degree of similarity is specified.

Upon formation of the group of the similar video clips, the graph generating unit 12 generates a graph with a directed weight, and detects an optimal path for merging the video clips. Specifically, the graph constructor 120 of the graph generating unit 12 generates a graph with a directed weight from the group of the similar video clips generated by the detection unit 11. In this regard, when a cyclic path is contained in the generated graph with a directed weight, the edge pruner 121 deletes at least one edge constituting the cyclic path. By using an automatic path finding for example, the path detector 122 detects an optimal path from the weighted directed graph not containing the cyclic path.

The merged video generating unit 13 generates a merged video by sequentially merging adjacent video clips on the detected optimal path. Specifically, when there is a key frame pair candidate between the adjacent videos, the merged video generating unit 13 merges the videos based on the result of the matching (i.e. seamless merge), and when there is no key frame pair candidate between the adjacent videos, the merged video generating unit 13 merges the videos in an "out-of-context" manner (e.g. direct merge).

A merged video can be generated through the processes described above.

Figure 15:
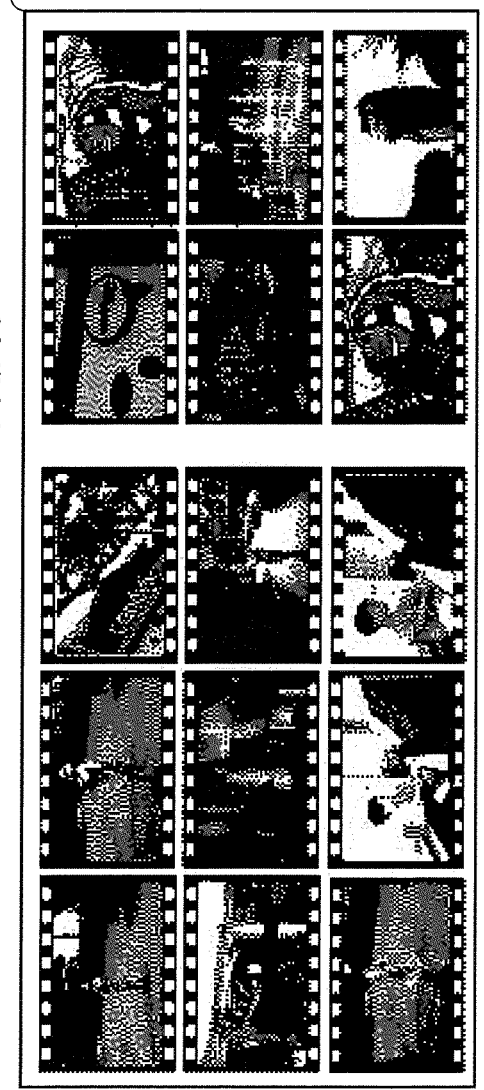
FIG. 15 explains an example of processing performed by the image processing device 1.
Figure 15:
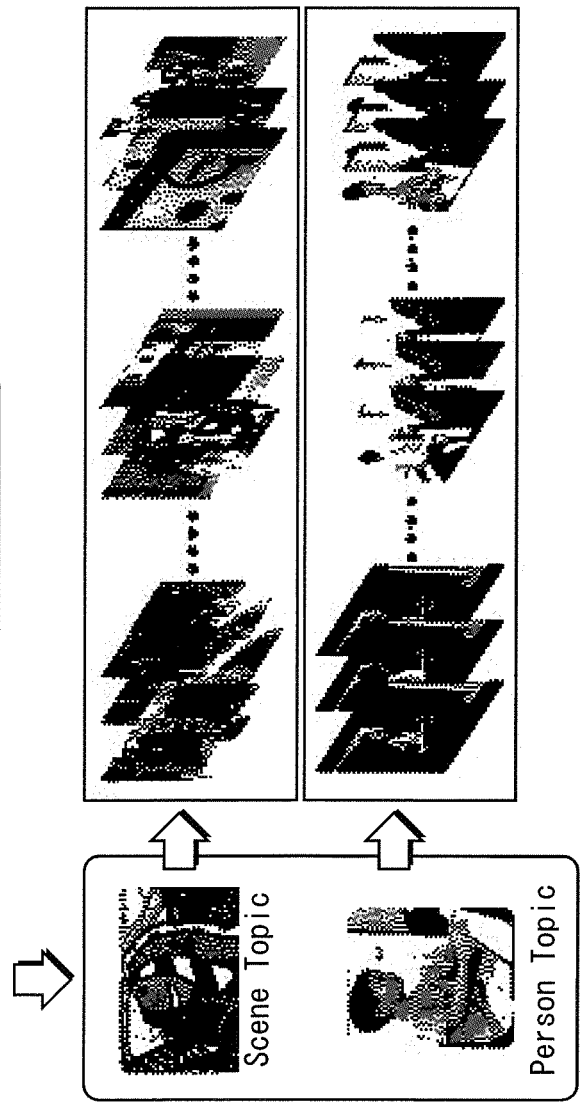

As described above, the image processing device 1 automatically detects video clips with "similar/continuous topics" in a video album and naturally stitch them into a single virtual long-take video, which can yield a cohesive presentation and conveys a consistent underlying story. FIG. 15 shows an example. The image processing device 1 automatically detects two topics (Scene Topic and Person Topic) from a plurality of video clips stored in the video storage unit 10, and generates a combined video according to each topic.

1.5 Modification Examples

The present invention has been described above based on an embodiment. However, the present invention is not limited to the embodiment above. For example, the following modifications may be applied.

(1) According to the embodiment above, the edge pruner 121 removes from the graph G the edge with the smallest directed weight among the edges constituting the detected cyclic path. However, the present invention is not limited in such a manner.

The edge pruner 121 may remove a cyclic path from the weighted directed graph under the limitation of time. Usually, a user browses videos (in particular home videos) in the order of time. Hence, the edge pruner 121 uses time stamp metadata of video clips to remove edges (i.e. disconnects videos) of a cyclic path so that the order of the recording date/time of the video clips will be kept. For example, when an edge in a cyclic path is directed from one video to another video with an older recording date/time, the edge pruner 121 removes the edge because such an edge disrupts the order of the recording date/time. With such an operation, any cyclic path is removed from the graph with a directed weight.

(2) According to the embodiment above, moving pictures (videos) composed of a plurality of frames are subject to the processing. However, the present invention is not limited in such a manner.

A single image (still image) may be subject to the processing. If this is the case, the starting frame and the ending frame are considered as the same, and a merged video as a mixture of moving pictures and still pictures (e.g. moving pictures (video01)-moving pictures (video02)-still picture (image01)-moving pictures (video03)) can be generated according to the operations described above.

(3) According to the embodiment above, the video storage unit 10 is provided in the image processing device 1. However, the present invention is not limited in such a manner.

The video storage unit 10 may be provided in an external device that is connected to the image processing device 1 via a network.

If this is the case, the image processing device 1 acquires video clips to be processed from the external device via the network.

(4) According to the embodiment above, the image processing device 1 is described as a device for generating a single merged video from a plurality of similar videos. However, the present invention is not limited in such a manner.

The image processing device 1 may be used for generating a video summary from a single video.

If this is the case, partial videos are generated by dividing a single video. Using these partial videos as the video clips pertaining to the embodiment described above, the image processing device 1 can seamlessly merge similar videos among the partial videos.

(5) The PmH scheme according to the embodiment above divides an image into p rectangular areas, and uses a same hash function for each area. However, the present invention is not limited in such a manner.

PmH may be applied in the following manner.

The first detector 100 divides an image into grid elements, and calculates min-hash sketch for each grid element by using a hash function. Here, the grid elements are the greatest common regions among partitions that cover that region.

Then, the elements that are associated with a given partition are searched for, and the true min-hash sketch is selected from among the min-hash sketches calculated on the elements found by search. Then, the selected min-hash sketch is regarded as the min-hash sketch of the image.

(6) A program describing the processing procedures according to the embodiment and the modification examples described above may be stored in a memory, and a Central Processing Unit (CPU) or the like may read and execute the program to realize the processing procedures.

Alternatively, a program describing the processing procedures may be stored on a recording medium to be distributed. Note that the recording medium used for storing the program above may be an external memory such as a flash memory, an USB memory, and an SD Card™.

(7) The components pertaining to the embodiment above may be realized a large scale integration (LSI) circuit. These components may each be realized as a single chip, or may be included in whole or in part on a common chip Although LSI is mentioned above, the term integrated circuit (IC), system LSI, super LSI, or ultra LSI may be used according to the degree of integration. Further, the integration method is not limited to LSI. The integrated circuit may also be realized as a private circuit or a general-purpose processor. An Field Programmable Gate Array (FPGA), which can be programmed after manufacturing an LSI, or a reconfigurable processor, with which the connections and configurations of the circuit cells within the LSI can be reconfigured, may also be used. Calculation performed by the functional blocks described above may also be performed by a Digital Signal Processor (DPS) or a Central Processing Unit (CPU). Furthermore, the processing steps described above may be recorded as a program on a recording medium and then executed.

(8) The embodiment described above and the modification examples may be combined.

1.7 Summary

The image processing device described above is different from conventional devices that either find a group of similar video clips or fit the composed video with extra information such as music or metadata. The image processing device described above automatically composes several related video clips into a virtual long-take video (i.e. merged video) with spatial and temporal consistency.

As described above, the image processing device contains three key components (i.e. the detection unit, the graph generating unit, and the merged video generating unit).

The detection unit has a function to (a) acquire video similarity measurement acting as evidence for ensuring the non-redundant and complete quality of the generated one-shot video; (b) fast and accurately locate the sequences in video pairs with start-end content correspondence; and (c) find the key frame pairs with transition clues in the correspondence sequences.

The graph generating unit has a function to select optimal video compositions from the composed video matching graph, i.e. a function to detect a path realizing an optimal playback order. This function can either work fully automatically by creating one-shot video with globally optimal content consistency or work interactively with users by generating one-shot videos with optional topics (such as specified key objects or persons).

The merged video generating unit has a function to merge each adjacent video correspondence pair on the optimal path one by one. At the parts to be merged, a matched object is subject to zoom-in and zoom-out, and an unmatched object is subject to feathering. Thus, the produced transition is more natural than the traditional transitions such as fade-in, fade-out, wipes, and dissolve. Since both image-level and sequence-level matching for video pairs are available, it is possible to accomplish a content-based continuous transition. The merged video generating unit virtually generates a consistent link for the transition.

The following introduces specific applications of the functions described above.

(Application 1) Personal Video Presentation With a large set of personal video contents, it is possible to generate the video matching graph which explicitly shows the content-consecutive relation of videos. The storyline (i.e. the optimal path on the weighted directed graph) detected from a plurality of video clips will automatically pop up. Besides, user only needs to appoint a specific person or scene, and it is possible to generate a one-shot presentation to describe the corresponding person or scene by mining the video graph.

(Application 2) Comprehensive Landmark Video Generation With multiple web videos that describe the same landmark, it is possible to generate a one-shot visual description of the landmark, which contains more comprehensive visual description of the landmark, such as the visual contents captured from different views.

(Application 3) When user retrieves the video clips via a network, the system automatically composes the similar ones and the user could watch the one-shot presentation effectively.

As seen from the applications above, the embodiment realizes home video presentation, landmark video generation, social network-centric personal video clips organization (e.g. clips retrieved via the Internet), and so on. In comparison with the conventional video abstraction and presentation techniques, the embodiment not only provides a novel presentation approach (a virtual one-shot video) but also facilitate further services such as editing.

The image processing device pertaining to the embodiment can automatically generate a virtual one-shot presentation from multiple video clips, provides a novel presentation of video contents and enables users to have a deeper impression of the story from the video collection.

The features of the image processing device can be summarized as follows.

(1) With the one-shot presentation generation by "Video Puzzle" according to the embodiment above, the image processing device extracts video contents about a specific topic and composes them into a virtual one-shot presentation. The scheme is flexible and several components can be customized and applied to different applications.

(2) The image processing device finds corresponding frames (i.e. similar frames) of multiple videos and then composes them into a clip with an optimization approach.

Long shot has been widely used in the professional film industry, MTV video and many other specific video domains owing to its uniqueness in presenting comprehensive content in a continuous and consistent way. Long shots can also facilitate video editing, as it is easy to cut them into shorter clips, but from short clips it is not easy to generate long shots. However, capturing a high-quality long-shot video needs an accurate coordination between the camera movement and the captured object for a long period, which is usually difficult even for professionals.

Long-shot video, also known as long-take video and one-shot video, means a video shot that is with relatively long duration.

The image processing device according to the embodiment provides a video composition technique which can both efficiently search content-consistent video group and naturally merge video clips using advanced matching of objects, with an aesthetically attractive one-shot presentation. That is, the image processing device makes it easy to generate a long shot video from short shot videos.

1.5 Supplemental Descriptions (1) One aspect of the present invention provides an image processing device comprising: a first processing unit configured to perform similarity detection on a group of video contents by comparing each one of the contents, which contains a first partial content and a second partial content subsequent to the first partial content, with another one of the contents as a subject content, which contains a plurality of consecutive partial contents constituting a portion of the subject content, so as to obtain a similarity value for each of the plurality of partial contents contained in the subject content in relation to the second partial content contained in the one of the contents, and to detect, as a third partial content, a partial content with the highest similarity value from among the plurality of partial contents contained in the subject content; and a second processing unit configured to generate relational information by using the highest similarity value obtained by the first processing unit, the relational information being used for merging the first partial content, the second partial content and the third partial content.

With the stated structure, the image processing device is capable of merging the second partial content with the third partial content, which has the highest similarity value among the plurality of partial contents. Because the contents are merged at their similar parts, the viewer does not feel unpleasant when the merged content is played back. Also, since the first partial content is contained in the merged content, the story line of the content involving the first partial content is retained.

Note that the first processing unit corresponds to the detection unit of the embodiment described above. The second processing unit corresponds to the combination of the graph generating unit 12 and the merged video generating unit 13 of the embodiment above.

(2) The first processing unit may obtain a frame similarity value in relation to the one of the contents for each of the rest of the contents by a predetermined feature conversion method, and specify, as the subject content, a content having a summary-level similarity to the one of the contents by using the frame similarity value.

With the stated structure, the image processing device uses the predetermined feature conversion method to realize coarse similarity detection compared with object detection.

(3) The predetermined feature conversion method may be Partition Min-Hashing, and the first processing unit may apply the Partition Min-Hashing to all frames of all the video contents to obtain hash values of all the frames, and compare hash values of the one of the contents and hash values of each of the rest of the contents, and specify the subject content based on the number of matched hash values With the stated structure, the image processing device performs the coarse similarity detection by using the Partition Min-Hashing algorithm, and detects the subject content that is similar to the one of the contents at high speed.

(4) The second partial content may be located in an ending portion of the one of the contents, and the plurality of partial contents contained in the subject content may constitute a starting portion of the subject content.

By locating the second partial content in the ending portion of the one of the contents, it is possible to make sure that there will be a portion that precedes the second partial content after the merge. Also, by locating the plurality of partial contents contained in the subject content so as to constitute a starting portion of the subject content, it is possible to make sure that there will be a portion subsequent to the third partial content after the merge. Thus, the stated structure surely retains the story line of the contents.

(5) The second partial content may have a same playback duration as each of the plurality of partial contents, and the first processing unit may obtain a frame similarity value for each of frames of the plurality of partial contents in relation to each of a predetermined number of frames among frames contained in the second partial content, and detect the third partial content by using the frame similarity value.

With the stated structure, the playback duration of the second partial content as the reference is the same as the plurality of partial contents contained in the subject content. Hence, the image processing device is capable of detecting accurate similarity values.

(6) The predetermined number of frames of the second partial content may be located from a starting position of the second partial content with regular intervals.

With the stated structure, the predetermined number of frames used for detecting the similarity values are located with regular intervals. Hence, the image processing device is capable of detect the similarity values uniformly across the second partial content.

(7) The relational information generated by the second processing unit may be a graph showing a relationship of the one of the contents with the other one of the contents to be merged therewith.

With the stated structure, the image processing device presents a graph showing the relationship among the contents to be merged. Hence, it is easy to specify the contents to be merged.

The second processing unit may generate a weighted directed graph on which each one of the contents, which contains the second partial content, and another one of the contents, which contains the third partial content that is similar to the second partial content, are associated by an edge that is weighted according to the similarity value for the third partial content, and detect, from the graph, a path from a first content to a second content among the contents according to weights given to edges in the graph, and, for each pair of adjacent contents on the path, merges the first partial content contained in one of the pair as an edge origin with the second partial content contained in the other one of the pair as an edge destination.

With the stated structure, the image processing device merges contents existing on the path. Hence the user can efficiently browse contents with a similarity.

(9) The second processing unit may further be configured to correct the weights given to the edges on the path so as to avoid detecting the contents on the path again when detecting another path, and repeat the path detection and the weight correction until the total of the weights of the edges on the path falls to a predetermined value.

With the stated structure, the image processing device does not detect the contents on the detected path again when detecting another longest path. Hence, after the user has viewed the merged content composed of the contents on the path, the user is prevented from viewing the contents contained in the merged content that the user has already viewed when viewing another merged content composed of contents on another path. Thus, the stated structure realizes efficient viewing.

(10) The second processing unit may detect the path so as to locate a content selected by a user at a starting position of the path, an ending position of the path, or a position therebetween.

Alternatively, when a contents group consisting of two or more contents is selected by a user, the second processing unit may detect a path passing through all the two or more contents.

Alternatively, when an object is specified by a user, the second processing unit may specify two contents containing the object, and determine one of the specified contents as the first content and the other one of the specified contents as the second content, and detect the path from the first content to the second content.

With the stated structures, the image processing device generates the merged content such that a content, a contents group or an object selected by the user will be included in the merged content. Hence, the user will be provided with a merged content having a similarity desired by the user.

(11) The second processing unit may generate a merged content by merging the first partial content, the second partial content, the third partial content and a fourth partial content in the stated order, the fourth partial content being contained in the subject content and being subsequent to the third partial content.

With the stated structure, the image processing device is capable of generating a merged content with the story line of the contents retained. This is because the merged content contains not only similar parts but also the first partial content preceding the second partial content and the fourth partial content subsequent to the third partial content. Therefore, the viewer can grasp the story line of the original contents in the merged content, without feeling unpleasant about the transition between the contents.

(12) The first processing unit may further be configured to detect a frame containing a matching object from the second partial content and the third partial content, and the second processing unit may detect a matching area from a first frame of the second partial content and a second frame of the third partial content both containing the matching object, apply image processing according to a zoom-in scheme on a first frame group composed of the first frame and a predetermined number of consecutive frames preceding the first frame, and apply image processing according to a zoom-out scheme on a second frame group composed of the second frame and a predetermined number of consecutive frames subsequent to the second frame, and apply morphing to the first frame and the second frame to generate one or more intermediate frames, and apply feathering to the first frame group, the second frame group and the one or more intermediate frames, except for respective areas containing the object, and generate the merged content by merging the first frame and the second frame with the one or more intermediate frames undergone the feathering interposed therebetween.

With the stated structure, the image processing device performs zoom-in, zoom-out, morphing and feathering to the parts to be merged. Hence, the transition of the images at the merged parts will be smoother than the case of simple merging.

(13) The first processing unit may detect the matching object by performing common pattern detection, face detection, human body detection, or any combination thereof on the second partial content and the third partial content.

With the stated structure, the image processing device is capable of surely detecting matched objects by performing common pattern detection, face detection, human body detection, or any combination thereof.

The image processing device pertaining to the present invention can be used for merging a plurality of videos into a single video effectively.

REFERENCE SIGNS LIST

1. Image processing device
10. Video storage unit
11. Detection unit
12. Graph generating unit
13. Merged video generating unit
100. First detector
101. Second detector
102. Matching processor
110. Common pattern detector
111. Human detector
112. Face detector
120. Graph constructor
121. Edge pruner
122. Path detector

The invention claimed is:
1. An image processing device comprising:
a first processing unit configured to perform similarity detection on a group of video contents by comparing each one of the contents, which contains a first partial content and a second partial content subsequent to the first partial content, with another one of the contents as a subject content, which contains a plurality of consecutive partial contents constituting a portion of the subject content, so as to obtain a similarity value in relation to the second partial content contained in the one of the contents for each of the plurality of partial contents contained in the subject content, and to detect, as a third partial content, a partial content with the highest similarity value from among the plurality of partial contents contained in the subject content; and a second processing unit configured to generate relational information by using the highest similarity value obtained by the first processing unit, the relational information being used for merging the first partial content, the second partial content and the third partial content, wherein the relational information generated by the second processing unit is generated as a graph showing a relationship of the one of the contents with the other one of the contents to be merged therewith, the graph is a weighted directed graph on which each one of the contents, which contains the second partial content, and another one of the contents, which contains the third partial content that is similar to the second partial content, are associated by an edge that is weighted according to the similarity value for the third partial content, and the second processing unit detects a path from a first content to a second content among the contents by using the weighted directed graph, and merges each adjacent pair of contents on the path.

2. The image processing device of claim 1, wherein
the first processing unit obtains a frame similarity value in relation to one of the contents for each of remaining contents by a predetermined feature conversion method, and specifies, as the subject content, a content having a summary-level similarity to the one of the contents by using the frame similarity value.

3. The image processing device of claim 2, wherein
the predetermined feature conversion method is Partition Min-Hashing, and
the first processing unit
applies the Partition Min-Hashing to all frames of all the contents to obtain hash values of all the frames, and
compares hash values of the one of the contents and hash values of each of the rest of the contents, and specifies the subject content based on the number of matched hash values.

4. The image processing device of claim 1, wherein
the second partial content is located in an ending portion of the one of the contents, and
the plurality of partial contents contained in the subject content constitute a starting portion of the subject content.

5. The image processing device of claim 1, wherein
the second partial content has a same playback duration as each of the plurality of partial contents, and
the first processing unit obtains a frame similarity value for each of frames of the plurality of partial contents in relation to each of a predetermined number of frames among frames contained in the second partial content, and detects the third partial content by using the frame similarity value.

6. The image processing device of claim 5, wherein
the predetermined number of frames of the second partial content are located from a starting position of the second partial content with regular intervals.

7. The image processing device of claim 1, wherein
the second processing unit detects, from the weighted directed graph, the path from the first content to the second content among the contents according to weights given to edges in the weighted directed graph, and, for each adjacent pair of contents on the path, merges the first partial content contained in one of the pair as an edge origin with the second partial content contained in the other one of the pair as an edge destination.

8. The image processing device of claim 7, wherein
the second processing unit detects the path by inverting the weights of the edges and solving the shortest path problem of the weighted directed graph with the inverted weights.

9. The image processing device of claim 8, wherein
the second processing unit is further configured to
correct the weights given to the edges on the path so as to avoid detecting the contents on the path again when detecting another path, and
repeat the path detection and the weight correction until the total of the weights of the edges on the path falls to a predetermined value.

10. The image processing device of claim 8, wherein
the second processing unit detects the path so as to locate a content selected by a user at a starting position of the path, an ending position of the path, or a position therebetween.

11. The image processing device of claim 8, wherein
when a contents group consisting of two or more contents is selected by a user, the second processing unit detects a path passing through all the two or more contents.

12. The image processing device of claim 8, wherein
when an object is specified by a user, the second processing unit specifies two contents containing the object, and determines one of the specified contents as the first content and the other one of the specified contents as the second content, and detects the path from the first content to the second content.

13. The image processing device of claim 1, wherein
the second processing unit generates a merged content by merging the first partial content, the second partial content, the third partial content and a fourth partial content in the stated order, the fourth partial content being contained in the subject content and being subsequent to the third partial content.

14. The image processing device of claim 13, wherein
the first processing unit is further configured to detect a frame containing a matching object from the second partial content and the third partial content, and
the second processing unit
detects a matching area from a first frame of the second partial content and a second frame of the third partial content both containing the matching object,
applies image processing according to a zoom-in scheme on a first frame group composed of the first frame and a predetermined number of consecutive frames preceding the first frame, and applies image processing according to a zoom-out scheme on a second frame group composed of the second frame and a predetermined number of consecutive frames subsequent to the second frame,
applies morphing to the first frame and the second frame to generate one or more intermediate frames,
applies feathering to the first frame group, the second frame group and the one or more intermediate frames, except for respective areas containing the object, and
generates the merged content by merging the first frame and the second frame with the one or more intermediate frames undergone the feathering interposed therebetween.

15. The image processing device of claim 14, wherein
the first processing unit detects the matching object by performing common pattern detection, face detection, human body detection, or any combination thereof on the second partial content and the third partial content.

16. An image processing method used by an image processing device, comprising:
a first step of performing similarity detection on a group of video contents by comparing each one of the contents, which contains a first partial content and a second partial content subsequent to the first partial content, with another one of the contents as a subject content, which contains a plurality of consecutive partial contents constituting a portion of the subject content, so as to obtain a similarity value in relation to the second partial content contained in the one of the contents for each of the plurality of partial contents contained in the subject content, and to detect, as a third partial content, a partial content with the highest similarity value from among the plurality of partial contents contained in the subject content; and
a second step of generating relational information by using the highest similarity value obtained in the first step, the relational information being used for merging the first partial content, the second partial content and the third partial content, wherein
the relational information generated in the second step is generated as a graph showing a relationship of the one of the contents with the other one of the contents to be merged therewith,
the graph is a weighted directed graph on which each one of the contents, which contains the second partial content, and another one of the contents, which contains the third partial content that is similar to the second partial content, are associated by an edge that is weighted according to the similarity value for the third partial content, and
in the second step, a path from a first content to a second content among the contents is detected by using the weighted directed graph, and each adjacent pair of contents on the path is merged.

17. A non-transitory computer-readable recording medium storing an image processing program used by an image processing device, comprising:
a first step of performing similarity detection on a group of video contents by comparing each one of the contents, which contains a first partial content and a second partial content subsequent to the first partial content, with another one of the contents as a subject content, which contains a plurality of consecutive partial contents constituting a portion of the subject content, so as to obtain a similarity value in relation to the second partial content contained in the one of the contents for each of the plurality of partial contents contained in the subject content, and to detect, as a third partial content, a partial content with the highest similarity value from among the plurality of partial contents contained in the subject content; and
a second step of generating relational information by using the highest similarity value obtained in the first step, the relational information being used for merging the first partial content, the second partial content and the third partial content, wherein
the relational information generated in the second step is generated as a graph showing a relationship of the one of the contents with the other one of the contents to be merged therewith,
the graph is a weighted directed graph on which each one of the contents, which contains the second partial content, and another one of the contents, which contains the third partial content that is similar to the second partial content, are associated by an edge that is weighted according to the similarity value for the third partial content, and
in the second step, a path from a first content to a second content among the contents is detected by using the weighted directed graph, and each adjacent pair of contents on the path is merged.

18. An integrated circuit used in an image processing device, comprising:
a first processing unit configured to perform similarity detection on a group of video contents by comparing each one of the contents, which contains a first partial content and a second partial content subsequent to the first partial content, with another one of the contents as a subject content, which contains a plurality of consecutive partial contents constituting a portion of the subject content, so as to obtain a similarity value in relation to the second partial content contained in the one of the contents for each of the plurality of partial contents contained in the subject content, and to detect, as a third partial content, a partial content with the highest similarity value from among the plurality of partial contents contained in the subject content; and
a second processing unit configured to generate relational information by using the highest similarity value obtained by the first processing unit, the relational information being used for merging the first partial content, the second partial content and the third partial content, wherein
the relational information generated by the second processing unit is generated as a graph showing a relationship of the one of the contents with the other one of the contents to be merged therewith,
the graph is a weighted directed graph on which each one of the contents, which contains the second partial content, and another one of the contents, which contains the third partial content that is similar to the second partial content, are associated by an edge that is weighted according to the similarity value for the third partial content, and
the second processing unit detects a path from a first content to a second content among the contents by using the weighted directed graph, and merges each adjacent pair of contents on the path.

* * * * *